(12) United States Patent
Novotny et al.

(10) Patent No.: US 10,633,212 B2
(45) Date of Patent: *Apr. 28, 2020

(54) RAPID DEPLOYMENT FRAC WATER TRANSFER SYSTEM

(71) Applicant: TETRA Technologies, Inc., The Woodlands, TX (US)

(72) Inventors: John Novotny, The Woodlands, TX (US); Scott Richie, The Woodlands, TX (US); Reza Talabi, Spring, TX (US); Yannick Harvey, The Woodlands, TX (US)

(73) Assignee: TETRA Technologies, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,663

(22) Filed: Jun. 18, 2018

(65) Prior Publication Data

US 2018/0370753 A1     Dec. 27, 2018

Related U.S. Application Data

(63) Continuation of application No. 15/412,981, filed on Jan. 23, 2017, now Pat. No. 10,000,358, which is a continuation of application No. 14/734,506, filed on Jun. 9, 2015, now Pat. No. 9,550,652, which is a continuation of application No. 13/689,907, filed on Nov. 30, 2012, now Pat. No. 9,052,037, which is a continuation-in-part of application No. 13/296,928, filed on Nov. 15, 2011, now Pat. No. 9,371,723.

(60) Provisional application No. 61/414,132, filed on Nov. 16, 2010.

(51) Int. Cl.
| | |
|---|---|
| *F16L 1/024* | (2006.01) |
| *B65H 59/18* | (2006.01) |
| *B65H 59/10* | (2006.01) |
| *B65H 49/20* | (2006.01) |
| *B65H 54/00* | (2006.01) |
| *B65H 67/00* | (2006.01) |
| *E21B 43/26* | (2006.01) |
| *E21B 19/22* | (2006.01) |

(52) U.S. Cl.
CPC .......... *B65H 59/10* (2013.01); *B65H 49/205* (2013.01); *B65H 54/00* (2013.01); *B65H 59/18* (2013.01); *B65H 67/00* (2013.01); *E21B 19/22* (2013.01); *E21B 43/26* (2013.01); *F16L 1/0243* (2013.01)

(58) Field of Classification Search
CPC ...... B65H 59/10; B65H 49/205; B65H 59/18; B65H 67/00; E21B 19/22; E21B 43/26; F16L 1/0243
See application file for complete search history.

(56) References Cited

U.S. PATENT DOCUMENTS 10,000,358 B2 *   6/2018   Novotny et al. ...... F16L 1/0243

\* cited by examiner

*Primary Examiner* — Kevin L Lee
(74) *Attorney, Agent, or Firm* — Roy Kiesel Ford Doody & North, APLC; Brett A. North

(57) ABSTRACT

A method of and apparatus for the rapid deployment of a fracturing water transferring system, along with the rapid picking up and storage of such system after use. In different embodiments the method in includes the use of a tensioning system to retrieve one or more segments of lay flat hose.

20 Claims, 42 Drawing Sheets

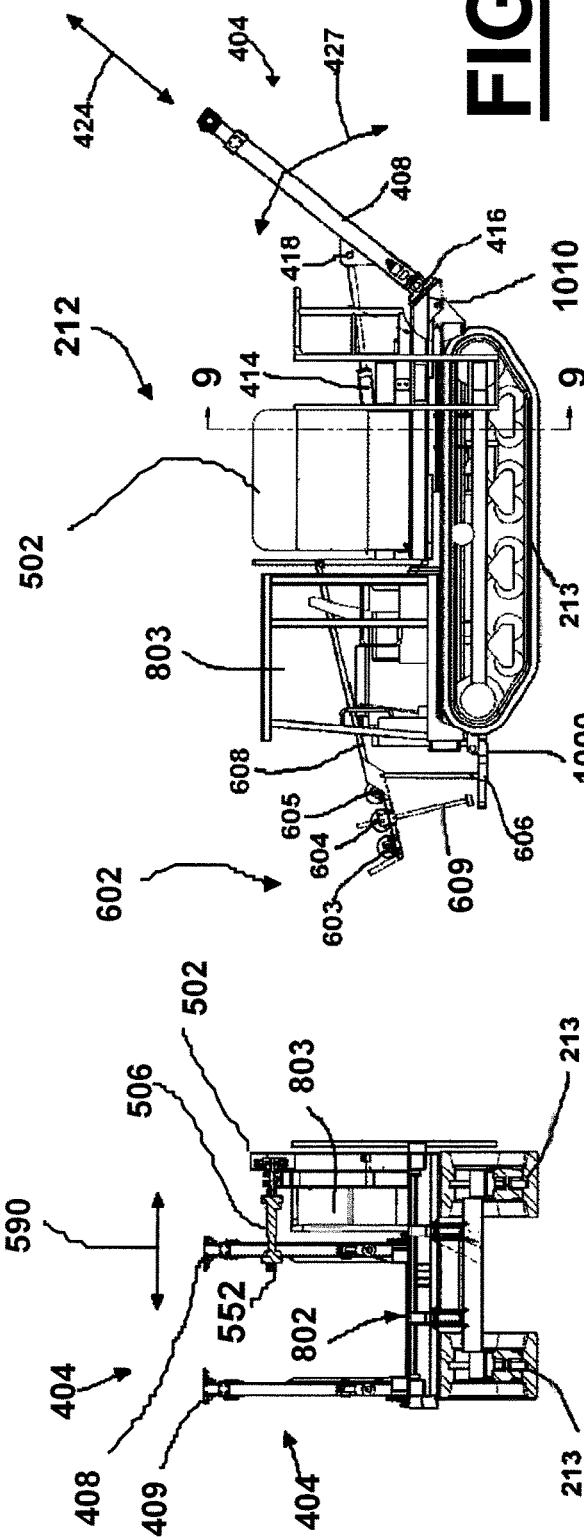
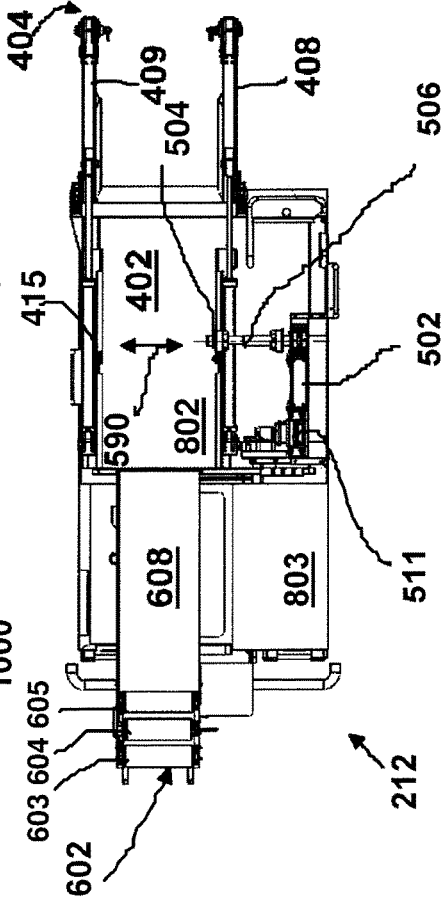
FIG. 7
FIG. 8
FIG. 9

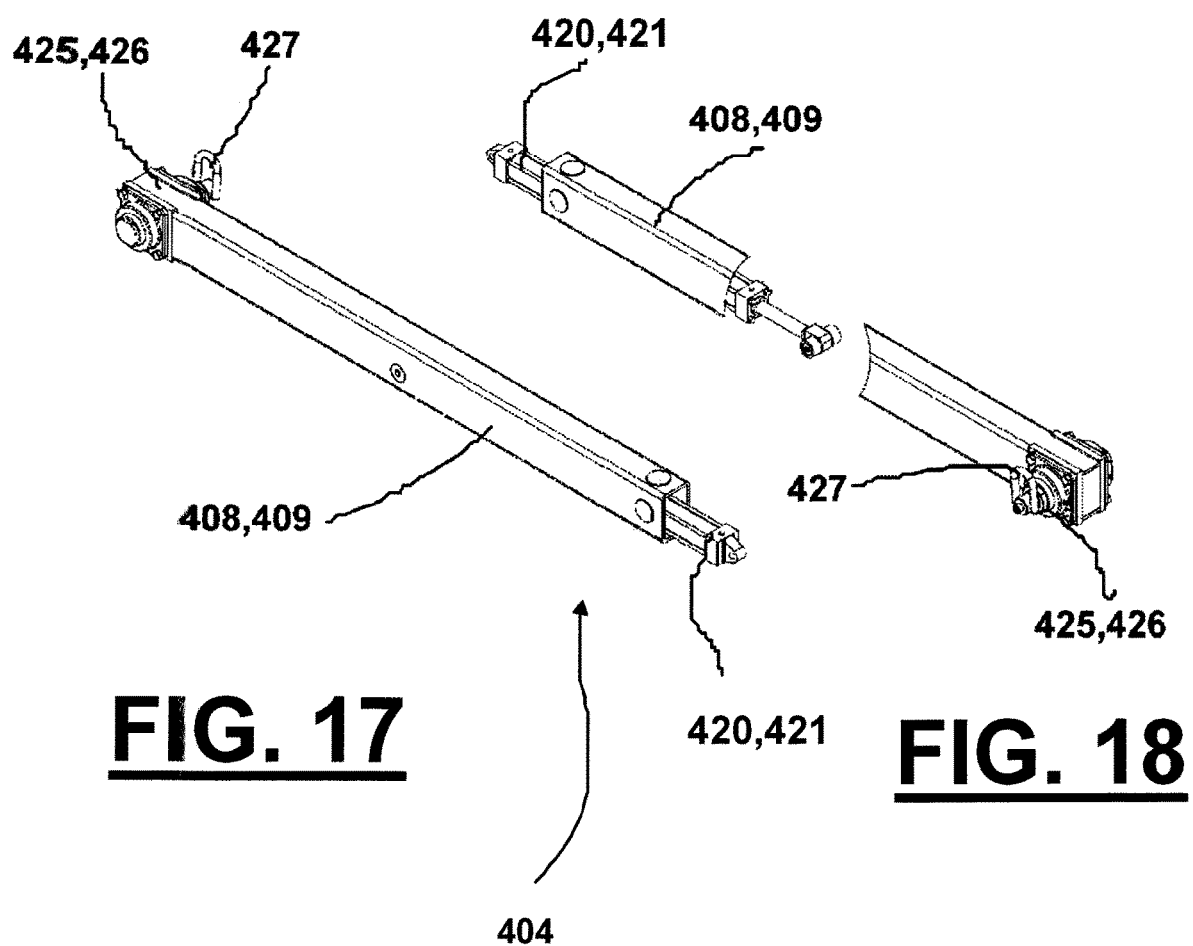

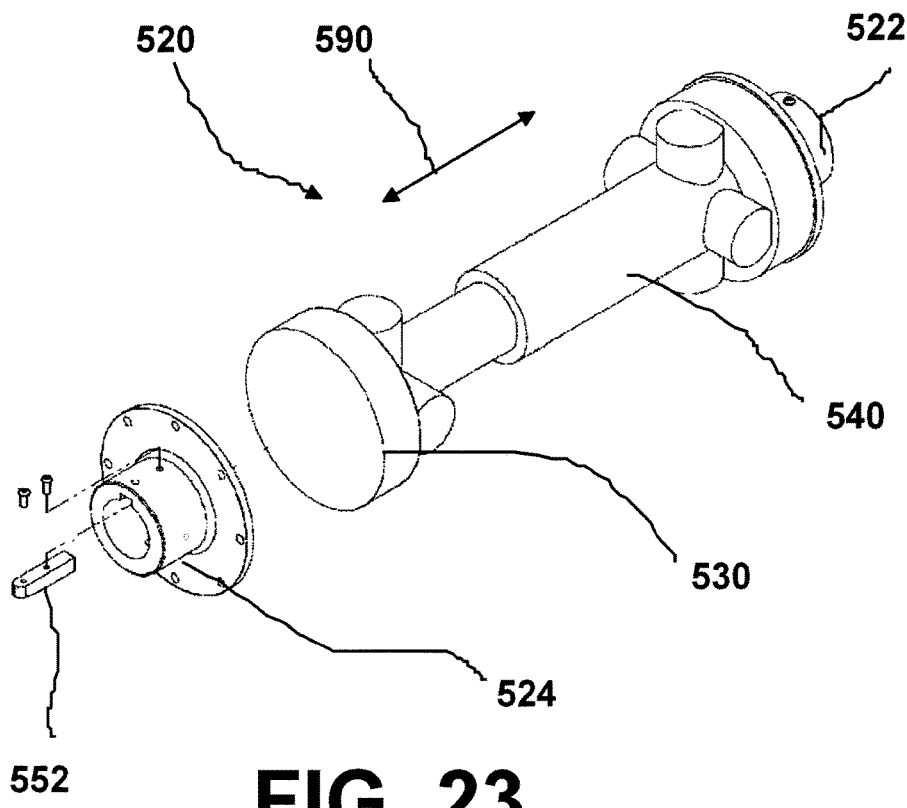
FIG. 23
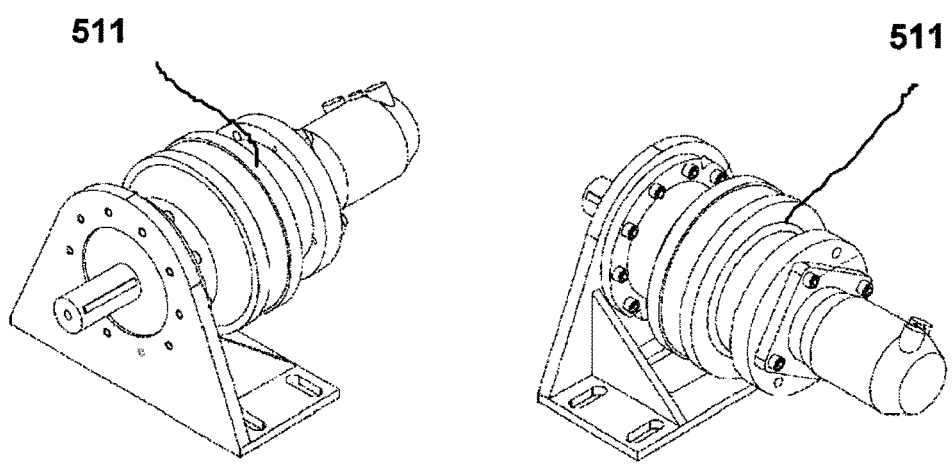
FIG. 21  FIG. 22

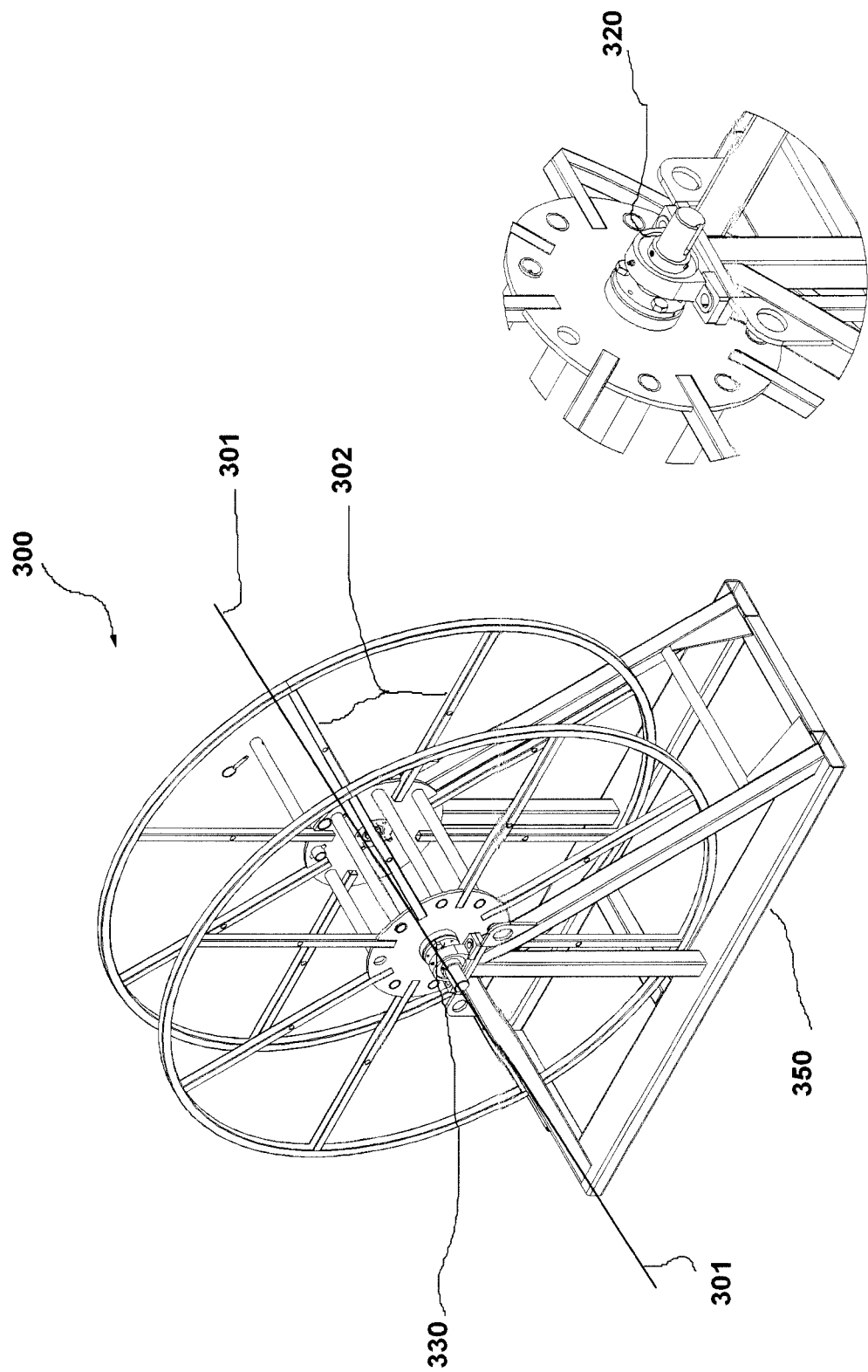

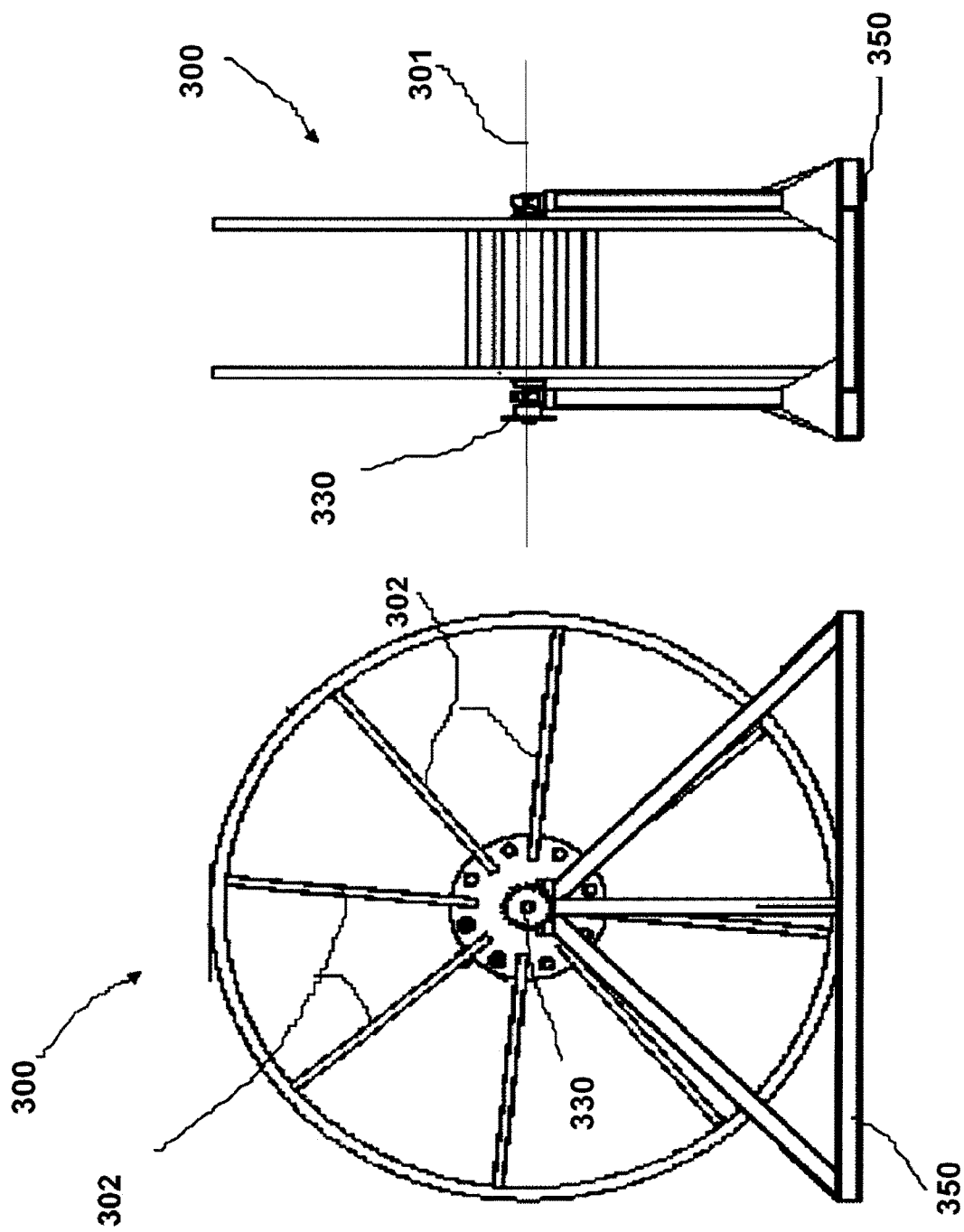

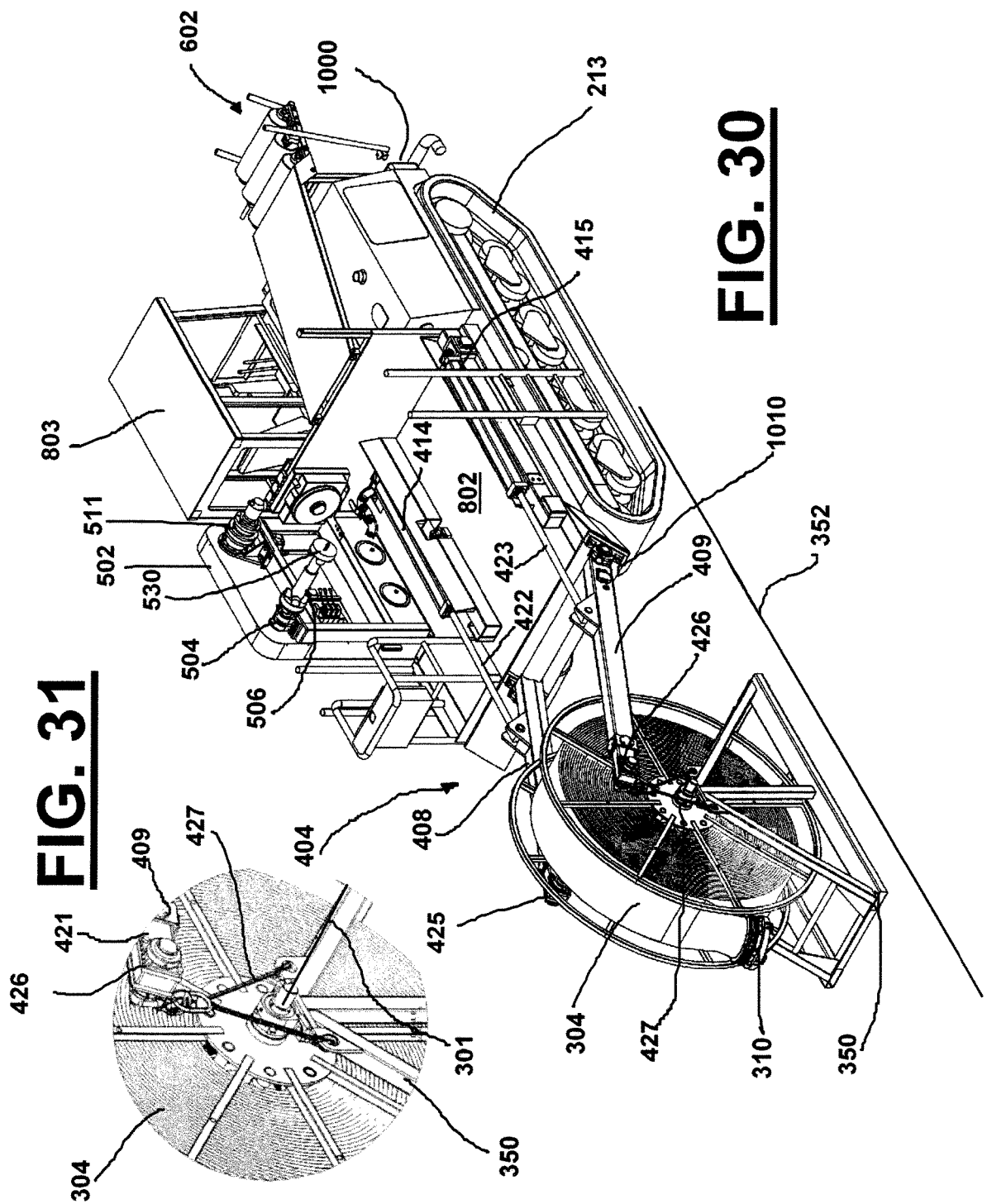

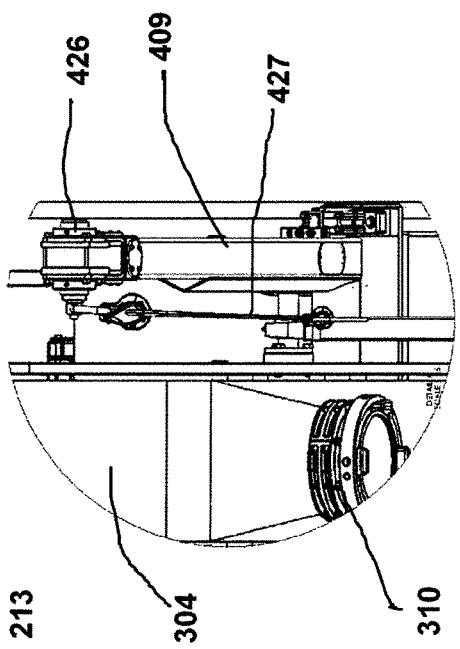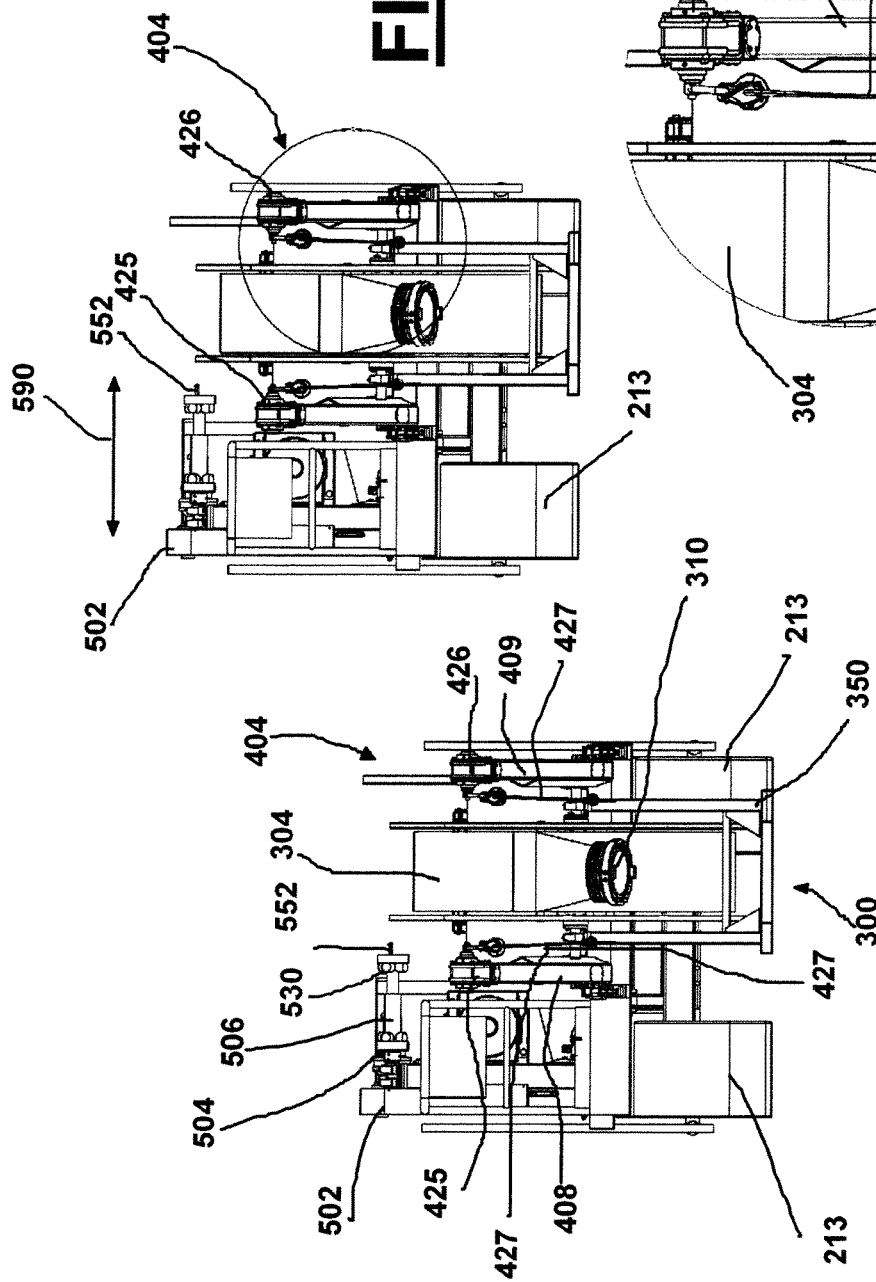

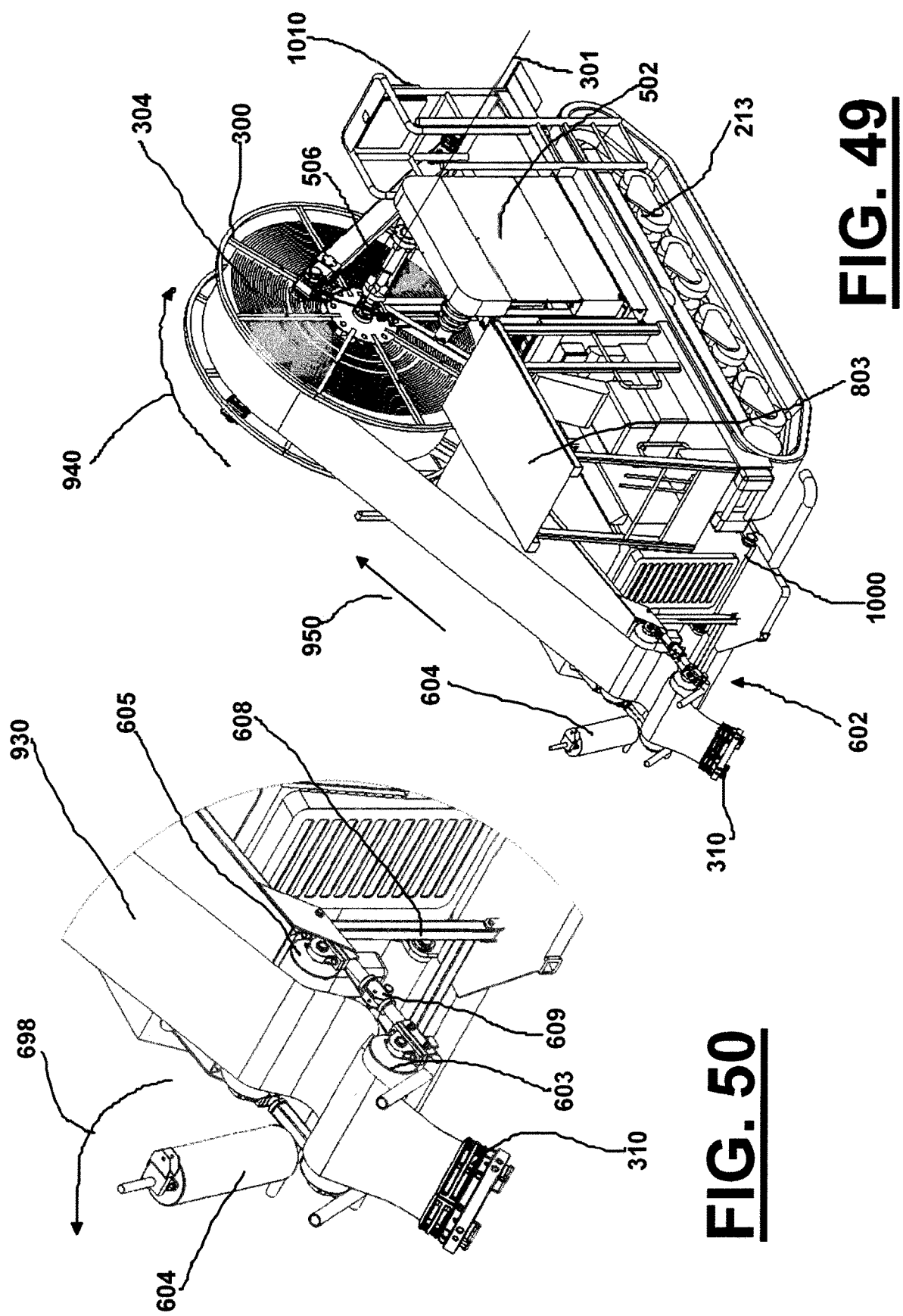

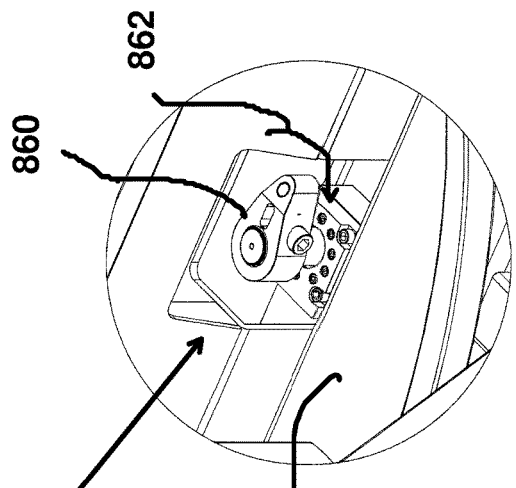
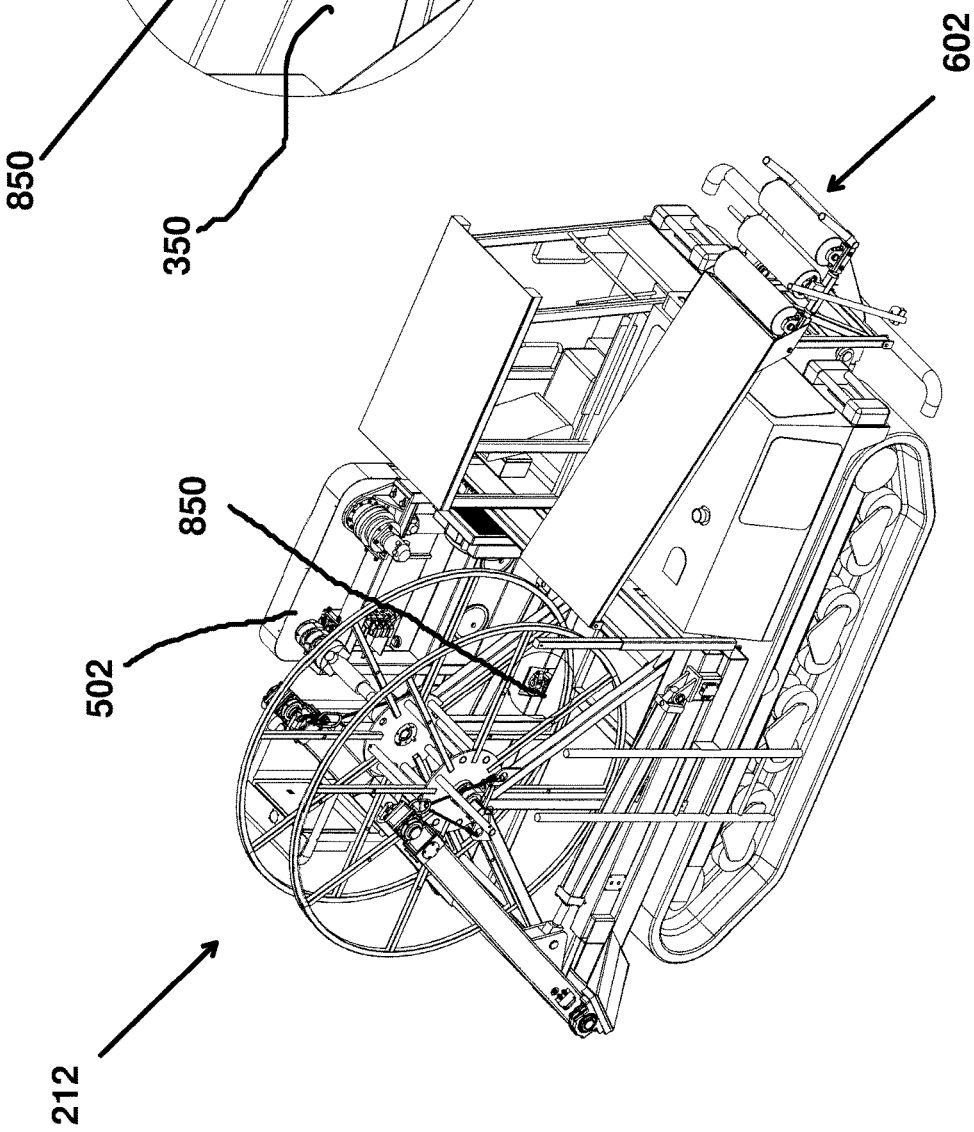
FIG. 54
FIG. 53

RAPID DEPLOYMENT FRAC WATER TRANSFER SYSTEM

CROSS-REFERENCE TO RELATED APPLICATIONS

This is a continuation of U.S. patent application Ser. No. 15/412,981, filed Jan. 23, 2017 (issuing as U.S. Pat. No. 10,000,358 on Jun. 19, 2018) which is a continuation of U.S. patent application Ser. No. 14/734,506, filed Jun. 9, 2015 (now U.S. Pat. No. 9,550,652) which is a continuation of U.S. patent application Ser. No. 13/689,907, filed Nov. 30, 2012 (now U.S. Pat. No. 9,052,037) which is a continuation in part of U.S. patent application Ser. No. 13/296,928, filed Nov. 15, 2011 (now U.S. Pat. No. 9,371,723) which was a non-provisional of U.S. Provisional Application Ser. No. 61/414,132, filed Nov. 16, 2010. Each of these applications are incorporated herein by reference and priority of each is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The invention relates generally to the rapid deployment and retrieval of a frac water transfer system used in oil and gas operations, and more particularly, to the rapid deployment and retrieval of a frac water transfer system used for hydraulic fracturing operations.

2. General Background

Hydraulic fracturing is a process used in the oil and gas industry to stimulate the production rate of a well. This process is also known as "fracing," or conducting a "frac job," in the industry. Techniques used in hydraulic fracturing generally involve injecting a fluid down a well at a high pressure. The injected fluid fractures the subterranean formation surrounding the well. A proppant may also be added to the fluid to aid in propping the fractures. The fractures create channels through which oil and/or gas can flow, facilitating the flow of the oil and/or gas to the well for production.

A typical preliminary step in preparing a frac job is transporting a large volume of water ("frac water") from a water source to a certain destination. The destination may be any receptacle suitable for holding frac water located in the vicinity of where the frac job will be carried out, including, but not limited to, a buffer pit, a frac pit, a frac tank, or a work tank.

BRIEF SUMMARY OF THE INVENTION

The apparatus of the present invention solves the problems confronted in the art in a simple and straightforward manner.

One or more embodiments of the invention relate to a system for transferring frac water between a source of the frac water and a frac water destination.

The system may comprise a subsystem for determining one or more characteristics of the frac water transfer system, and a portable frac water delivery subsystem. The subsystem for determining one or more characteristics of the frac water transfer system may comprise means for measuring one or more terrain parameters between the frac water source and the frac water destination, and means for designing a pipeline to be assembled between the frac water source and the frac water destination.

The means for designing may receive the one or more terrain parameters as input and generate output data. The output data may be presented as a set of pressure profiles reflecting one or more measurements relating to one or more characteristics of the pipeline to be assembled.

The portable frac water delivery subsystem may comprise one or more segments of lay flat hose and one or more tracked carriers for transporting the lay flat hose. The one or more segments of the lay flat hose may be connected in series to assemble one or more pipelines for transferring the frac water from the source of the frac water to the frac water destination. Each of the tracked carriers may comprise a lifting subsystem and a tensioning subsystem. The lifting subsystem may be used to load the one or more spools onto the tracked carrier and/or offloading the one or more spools from the tracked carrier. The lifting subsystem may comprise an arm. One or more linkages may connect the arm to the tracked carrier. To control the arm, one or more hydraulic cylinders may be used to move the one or more linkages. The arm may be used to selectively engage the one or more spools. The tensioning subsystem may be used to flatten the one or more segments of the lay flat hose to be wound onto the one or more spool. Further, the tensioning subsystem may be used to substantially remove water from the one or more segments of the lay flat hose. The tensioning subsystem may comprise a drive subsystem for rotating the one or more spools. A plurality of rollers may selectively engage the one or more segments of the lay flat hose onto the one or more spools.

The one or more segments of the lay flat hose may be routed through the plurality of rollers in an alternating over and under configuration. The system may further comprise one or more conveyance vehicles for transporting equipment between an equipment storage site and the frac water source and/or the frac water destination, the equipment comprising the one or more spools. One or more embodiments of the invention relate to a method of deploying a system for transferring frac water between a source of the frac water and a frac water destination. The method may involve determining one or more characteristics of the frac water transfer system; deploying a portable frac water delivery subsystem; and assembling one or more pipelines for transferring the frac water from the source of the frac water to the frac water destination. Determining one or more characteristics of the frac water transfer system may involve measuring one or more terrain parameters between a water source and a water destination and determining one or more pipeline design parameters. One or more pipelines to be assembled may be designed using a means for designing. The means for designing may receive the one or more terrain parameters and the one or more design parameters as input. The means for designing may further generate output data presented as a set of pressure profiles reflecting one or more measurements relating to one or more characteristics of the pipeline to be assembled.

The portable frac water delivery subsystem may comprise one or more segments of lay flat hose and one or more tracked carriers for transporting the lay flat hose. Each tracked carrier may comprise a tensioning subsystem for flattening the one or more segments of the lay flat hose to be wound onto one or more spools. The method may further involve conveying one or more spools to the frac water source and/or the frac water destination, the one or more spools wound with the one or more segments of the lay flat hose. The method may further involve loading the spools onto the one or more tracked carriers and/or offloading the one or more spools from the one or more tracked carriers. The tracked carriers may further comprise a lifting subsystem for loading and/or offloading the one or more spools. The lifting subsystem may comprise an arm. One or more linkages may connect the arm to the tracked carrier. To control the arm, one or more hydraulic cylinders may be used to move the one or more linkages. The arm may be used to selectively engage the one or more spools. The method may further involve retrieving the one or more segments of the lay flat hose from the ground. Retrieval may involve selectively engaging the tensioning subsystem with the one or more segments of the lay flat hose. The tensioning subsystem may further comprise a plurality of rollers, and a drive subsystem for rotating the one or more spools. Retrieval may further involve routing the one or more segments of the lay flat hose through the plurality of rollers; winding the one or more segments of the lay flat hose onto the one or more spools; and substantially removing water from the one or more segments of the lay flat hose. Assembling the pipeline may involve connecting a plurality of segments of the lay flat hose in series. The ends of the segments of the lay flat hose may be fitted with sexless, easy to connect couplings. One or more embodiments of the invention may relate to a computer program product. The computer program product may comprise a computer usable medium having computer readable code embodied thereon for determining one or more characteristics of a frac water transfer system. The computer readable program code may comprise computer program code for receiving one or more terrain parameters as input; computer readable program code for receiving one or more design parameters as input; and computer readable code for generating output data based on at least one of: at least one terrain parameter; and at least one design parameter. The one or more terrain parameters may comprise at least one of: distances between adjacent points along a flow path of the frac water transfer system, elevations at points along the flow path, one or more parameters indicative of a degree of obstruction of the flow path; and one or more measurements taken by measurement devices disposed along the flow path, the one or more measurements relating to the one or more characteristics. The one or more design parameters may comprise at least one of: a number of one or more pumps along the flow path, placement locations of the one or more pumps along the flow path, a number of one or more filter pods along the flow path, and placement locations of the one or more filter pods along the flow path.

The output data may relate to one or more characteristics of the frac water transfer system, including, but not limited to: water hammer or hydraulic shock effects; wave velocity; friction; hydrostatic head; hydraulic force; pressure loss due to friction; andpositive pressure needed to overcome friction.

The computer program product may further comprise computer readable program code for adjusting at least one of: at least one terrain parameter; and at least one design parameter to generate at least one adjusted parameter.

The at least one adjusted parameter may comprise: an adjustment to at least one of: the one or more parameters indicative of a degree of obstruction of the flow path, the number of pumps, the placement locations of the pumps along the flow path, the number of filter pods, and the placement locations of the filter pods along the flow path. Computer readable program code may receive the at least one adjusted parameter as input and generate updated output data based on the at least one adjusted parameter. The output data may be presented to a user as a set of pressure profiles reflecting one or more measurements relating to the one or more characteristics of the frac water transfer system. The computer program product may further comprise computer readable program code for generating final output data from the updated output data on the condition that at least one characteristic of the frac water transfer system represented by updated output data is within a predetermined range from a desired value of the at least one characteristic.

Water for use in hydraulic fracturing is often referred to as "frac water". Frac water may be obtained from one or more sources of water comprising lakes, rivers, ponds, creeks, streams, well water, flow-back water, produced water, treated water and any other source of water. Conventional methods of moving water over long distances involve extensive labor, time and transportation of, among other things, fixed-length pipes, fittings, and pumps.

One or more embodiments of the present invention relate to a system, method and apparatus for the rapid deployment and retrieval of a frac water transfer system. Embodiments of the system and method of the present invention employ one or more flexible, lay flat hoses and/or one or more segments of lay flat hose for the transfer of frac water over long distances. In one embodiment, a computer program product is provided.

The lay flat hose may be collapsible such that it may lay flat when substantially empty (i.e. substantially devoid of water or other matter). Thus, the lay flat hose can be wound onto spools, folded into flaking boxes, or otherwise stored in a compact manner. Because the hose is very flexible and conforms to the terrain upon which it is laid, 90°, 45°, 22.5°, or other elbow fittings would not be required in order to have a pipeline containing turns. Characteristics of fluid flow in a pipe such as working pressure, burst pressure, maximum efficiency rate, and maximum feasible rate are considerably higher and thus more desirable for the lay flat hose than for pipes used in conventional methods for frac water transportation.

The lay flat hose may require fewer connections and pumps than the pipes used in conventional methods for frac water transportation to achieve the desired characteristics during frac water transfer. Moreover, the lay flat hose is difficult to damage, having a life expectancy of approximately five years, whereas the pipes used in conventional methods for frac water transportation have a life expectancy of approximately 2 years.

In one conventional method, thirty foot (30') long segments of aluminum piping with an outer diameter often inches (10") are connected in series to form a pipeline for transporting water over a long distance. A mile of straight piping (i.e., piping containing no turns) may require approximately 176 connections. Clamp type connections are typically used to join the pipes. For pipelines containing turns, 90°, 45°, 22.5°, or other elbow fittings may be required. Water may potentially leak through each connection or fitting, thereby decreasing the efficiency of the pipeline and wasting water. The working pressure of the aluminum piping may be approximately 80 psi and the burst pressure may be approximately 150 psi. The maximum efficiency rate may be less than 50 bpm and the maximum feasible rate may be approximately 75 bpm.

In another conventional method, 3200 ft. or 500 ft. long segments of polyethylene piping with an outer diameter of 4 in. or 6 in., respectively, are connected in series to form a pipeline for transporting water over a long distance. Pipelines having these specifications transfer water at low rates and therefore may not be viable for real-time water transfer.

In yet another conventional method, 30 ft. long segments of polyethylene piping with an outer diameter of 12 in. are connected in series to form a pipeline for transporting water over a long distance. A mile of straight piping may require approximately 176 connections. Water may potentially leak through each connection, thereby decreasing the efficiency of the pipeline and wasting water. For pipelines containing turns, 90°, 45°, 22.5°, or other elbow fittings may be required. The working pressure of the polyethylene piping may be approximately 150 psi and the burst pressure may be approximately 317 psi.

The maximum efficiency rate may be approximately 76 bpm and the maximum feasible rate may be approximately 92 bpm. Weighing approximately 26 lbs/ft., manual handling of the polyethylene piping segments is impractical. In one or more embodiments of the invention, a lay flat hose may be deployed in segments ranging from about 5 ft. long to about 700 ft. long and have a nominal inner diameter ranging from about 3 in. to about 16 in. In one or more embodiments, the lay flat hose is deployed in 500 ft. long segments with a nominal inner diameter of 12 in. A straight mile of pipeline constructed out of the lay flat hose may require approximately 11 connections.

Because the hose is flexible and conforms to the terrain upon which it is laid, elbow fittings, which are prone to leaking, would not be required for pipelines containing turns. The working pressure of the lay flat hose may be approximately 175 psi and the burst pressure may be approximately 400 psi. The maximum efficiency rate may be approximately 100 bpm and the maximum feasible rate may be approximately 130 bpm. The lay flat hose is made of circular woven high tenacity polyester. An elastomeric polyurethane cover and lining completely encapsulate the polyester. A variety of other types of lay flat hose may also be available at a range of sizes, materials, and capabilities. Any lay flat hose suitable for the rapid deployment and retrieval of a frac water transfer system may be used in embodiments of the present invention.

One or more embodiments of the invention are directed to a computer program product for use in connection with the design and deployment of frac water transfer systems in accordance with embodiments of the invention. The computer program product may generate output data that includes measurements of frac water flow characteristics and/or pressure characteristics determined based on various input parameters. The output data generated by the computer program product may be utilized in making design and equipment choice/placement decisions in connection with the deployment of frac water transfer systems according to embodiments of the invention. The computer program product may comprise a computer usable medium having computer readable program code embodied therein. The computer readable program code may comprise computer readable code for receiving as input one or more terrain parameters. The terrain parameters may include, but are not limited to, distances between adjacent discrete points along the flow path of the frac water from the source to the destination as well as elevations at discrete points along the path. The discrete points between which distance measurements may be taken and/or the discrete points at which elevation measurements may be taken may coincide with the endpoints of segments of the flexible hose. Alternatively, the distance and elevation measurements may be taken continuously at any one or more points along the path traversed by the flexible hose when deployed.

A manual survey of the terrain may be performed to determine the distance and elevation parameters. Alternatively, or in conjunction with the manual survey, a global positioning system (GPS) device may be employed to precisely measure distances and elevation differences between discrete points along the path. The GPS device may also be used to take continuous distance and elevation measurements along the flow path. In addition to the distance and elevation measurements, the terrain parameters may also comprise one or more parameters indicative of a degree of obstruction at one or more discrete points along the path of the flexible hose. More specifically, the one or more parameters indicative of a degree of obstruction may represent a measure of the degree to which terrain characteristics may obstruct frac water flow through the flexible hose at one or more points along the flow path.

The distance, elevation, and obstruction parameters, along with any other terrain parameters that may be determined, may together provide a comprehensive survey of the terrain. The computer readable program code may further comprise computer readable program code for receiving as input one or more design parameters. Design parameters may include a number of and/or locations along the frac water flow path at which one or more pumps and/or one or more filter pods may be placed. Adjustments to the number and/or placement of pumps and filter pods may affect frac water flow rates and pressure and flow characteristics at various points along the flow path.

The computer program product may take as inputs one or more of the terrain and/or design parameters noted above and generate output data relating to one or more of the following pressure/flow characteristics: water hammer or hydraulic shock effects, wave velocity, friction, hydrostatic head, hydraulic force, pressure loss due to friction, positive pressure needed to overcome friction, or any combination thereof.

However, it should be noted that the above list is not exhaustive and the output data may include any other suitable measurement for assisting in the design, implementation, and deployment of a frac water transfer system according to embodiments of the invention. In order to generate the output data, the computer program product may also receive, as input, data provided by various measurement devices disposed along the frac water flow path correspondingly to the points between which and at which distance and elevation measurements are taken.

The output data may be provided in the form of a set of pressure profiles reflecting any one or more of the measurements discussed above taken at discrete or continuous points along the frac water flow path. If the pressure and flow measurements provided by way of the pressure profiles do not conform to desired values, one or more parameters may be adjusted and new output data based on the adjusted parameters may be generated. This process may be performed iteratively until the desired pressure and flow characteristics are achieved. More specifically, the path of the flexible hose pipeline from source to destination as well as the location and/or number of pumps and/or filter pods may be determined through an assessment of the output data generated by the computer program product based on iterative adjustments to the input parameters.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a top view of the vehicle of FIG. 1;

FIG. 8 is a side view of the vehicle of FIG. 1 taken from the driver side;

FIG. 9 is a sectional view of the vehicle through the lines 9-9 of FIG. 8;

FIG. 17 is a perspective view of one of the arms.

FIG. 18 is a perspective view of the arm of FIG. 17 broken open to show the hydraulic cylinder which expands and retracts the arm.

FIG. 21 is a perspective view of the motor powering the reel rotating and tensioning system.

FIG. 22 is a perspective view of the motor powering the reel rotating and tensioning system taken from the opposite side as FIG. 21.

FIG. 23 is an exploded perspective view of the sliding connection between the reel rotating and tensioning system of FIG. 21 and the reel.

FIG. 24 is a perspective view of a reel rotatably connected to a support base.

FIG. 25 is a perspective view of a bearing that rotatably connects the reel to the base.

FIG. 26 is a side view of the reel of FIG. 24.

FIG. 27 is a rear view of the reel of FIG. 24.

FIG. 30 is a perspective view of the reel lifting system of the vehicle about to pick up a reel from the ground.

FIG. 31 is an enlarged perspective view of a connection between the reel lifting system and the reel.

FIGS. 32 and 33A are rear views of the reel lifting system of the vehicle about to pick up a reel from the ground.

FIG. 33B is an enlarged view of a connection between the reel lifting system and the reel.

FIG. 49 is a front perspective view of the vehicle of FIG. 1 taken from the driver side showing the taking up of a hose from the ground.

FIG. 50 is an enlarged view of the tensioning system used during take up with the articulating roller being in an up position.

FIG. 53 is a front perspective view of the vehicle of FIG. 52 with a reel loaded on the vehicle and the reel locking system in an unlocked state.

FIG. 54 is an enlarged perspective view of the reel locking system shown in FIG. 53.

DETAILED DESCRIPTION OF THE INVENTION

Figure 1:
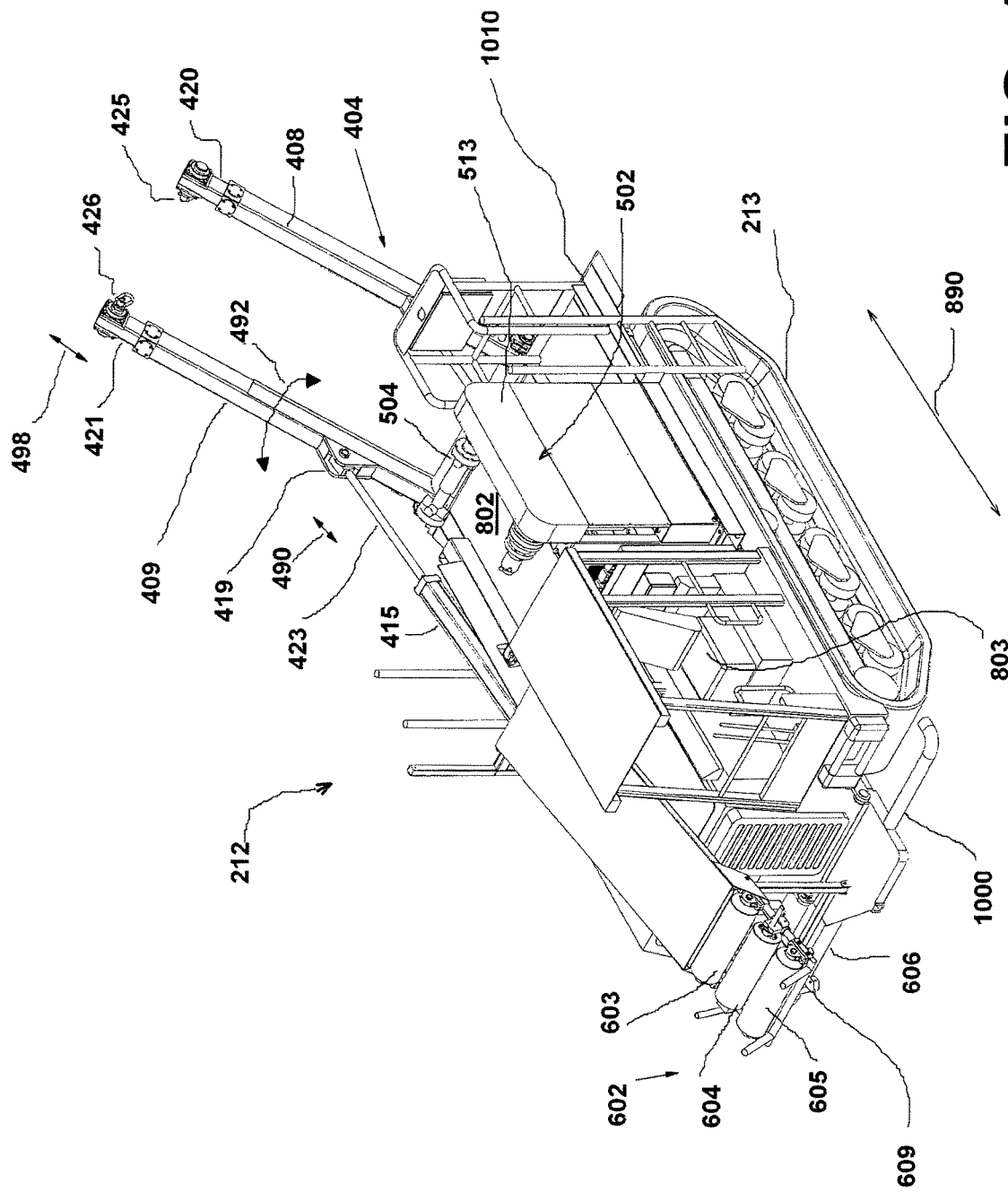
FIG. 1 is a front perspective view of a preferred embodiment for a layout and take up vehicle taken from the driver side.
Figure 2:
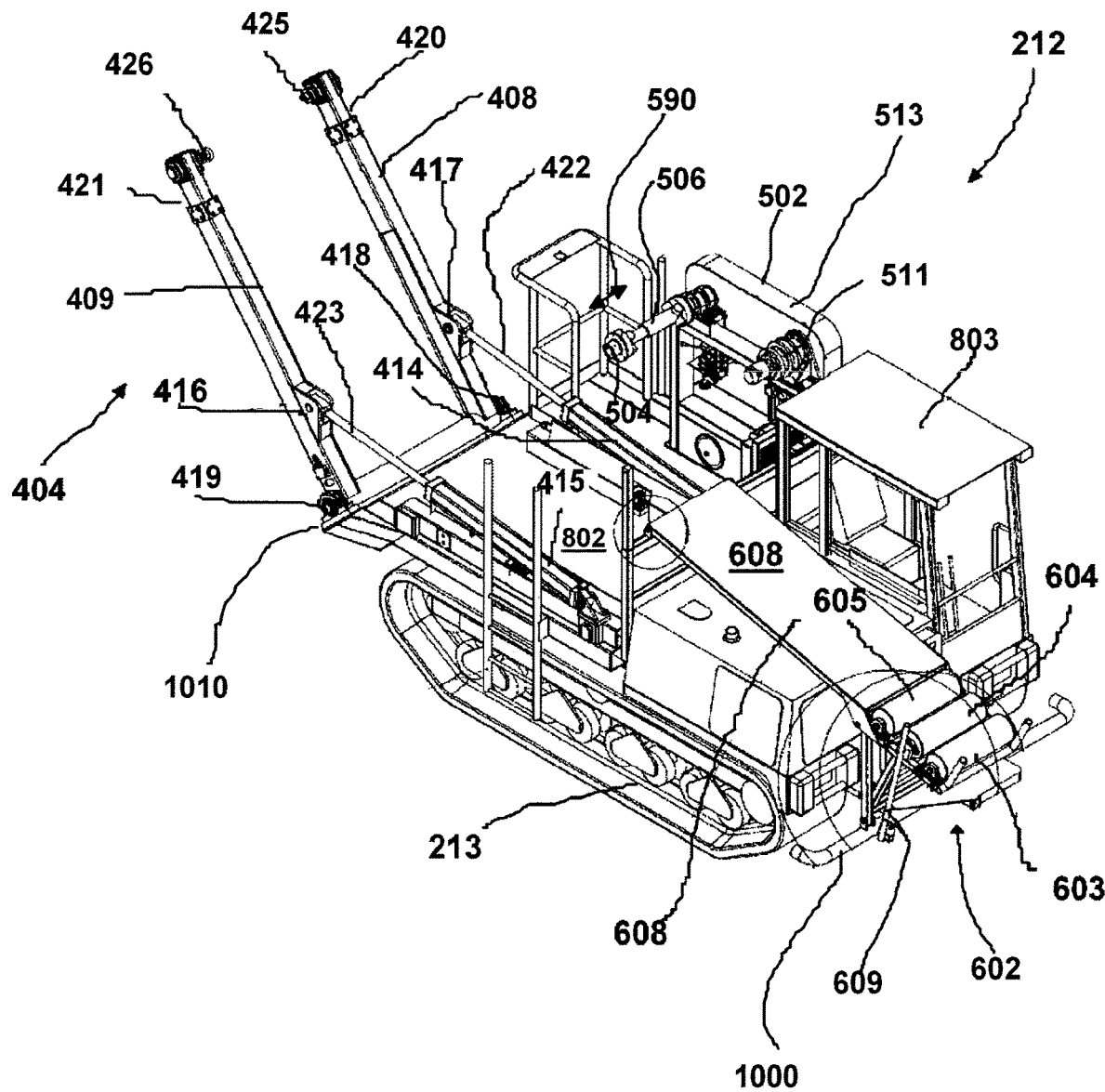
FIG. 2 is a front perspective view of the vehicle of FIG. 1 taken from the non-driver side.
Figure 3:
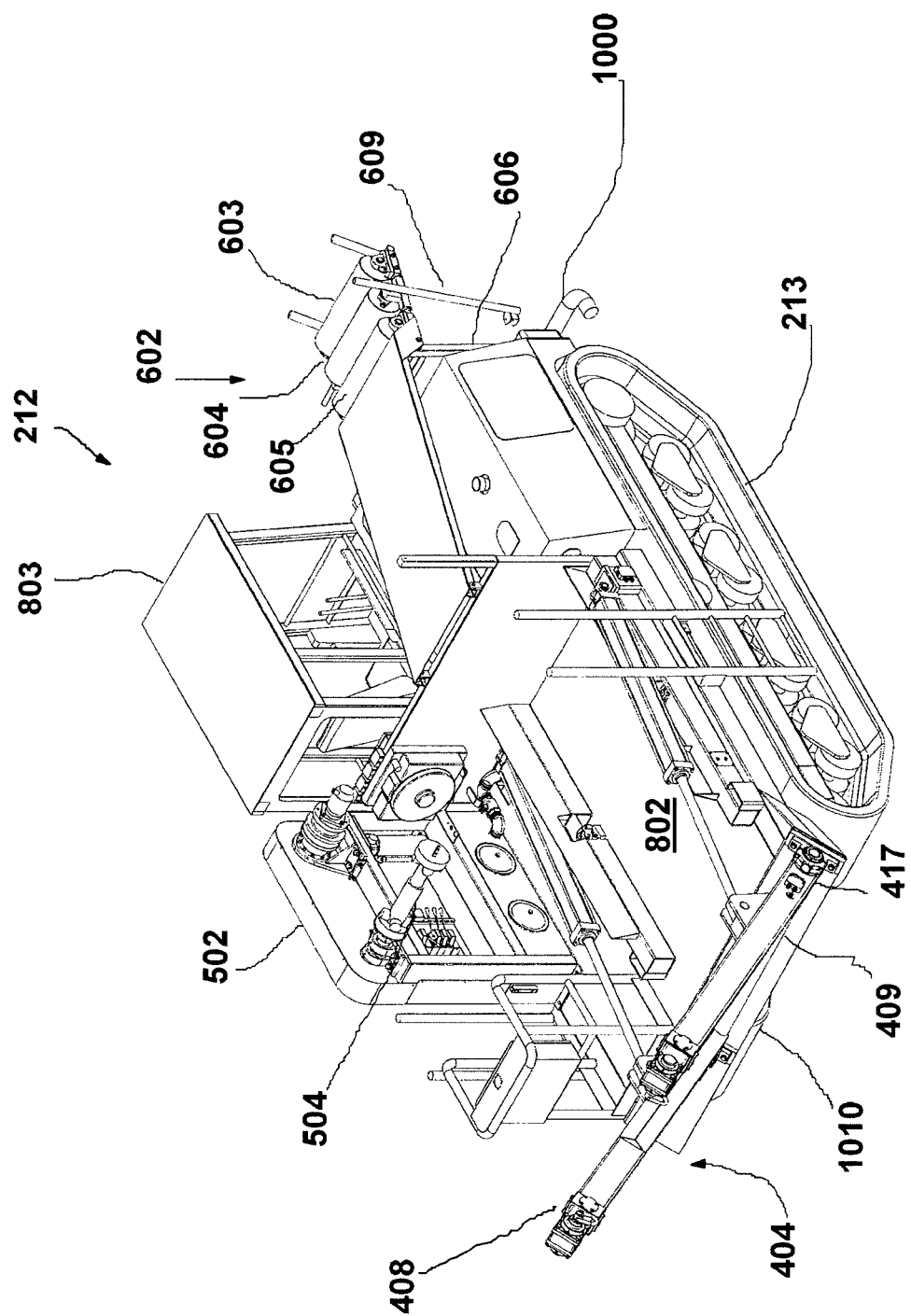
FIG. 3 is a rear perspective view of the vehicle of FIG. 1 taken from the non-driver side.
Figure 4:
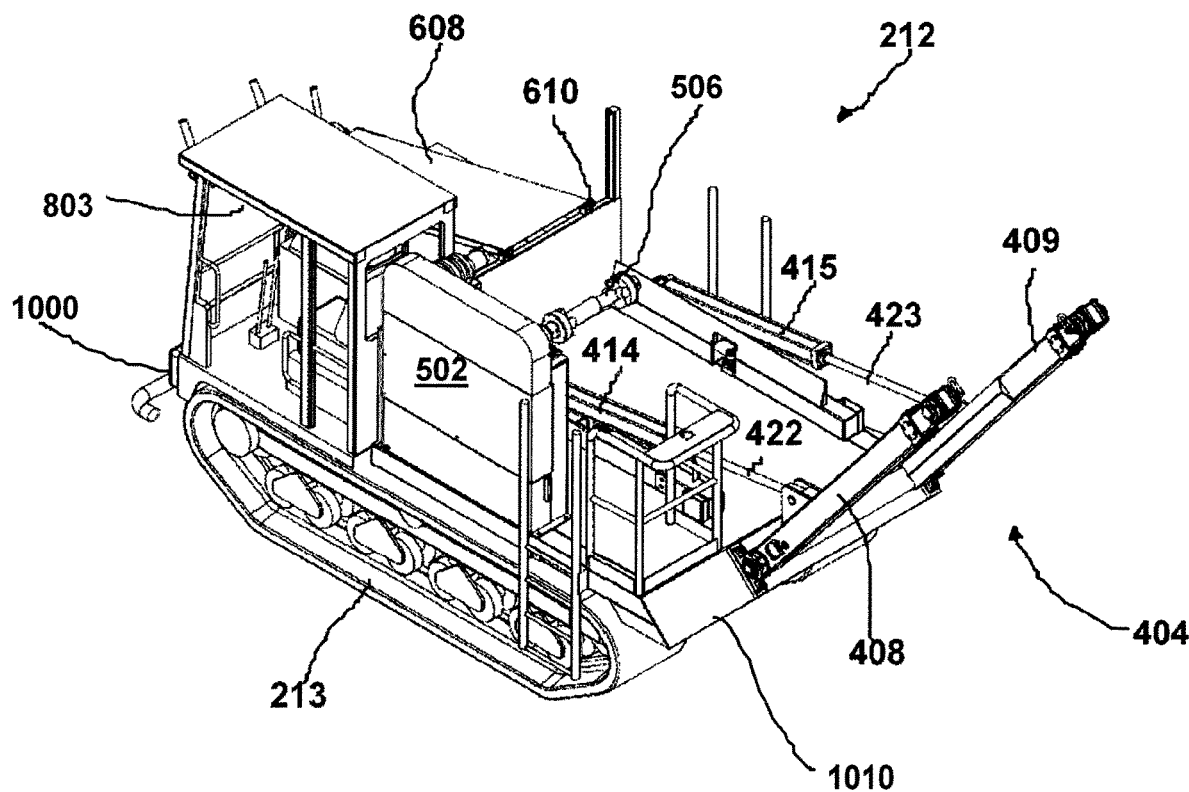
FIG. 4 is a rear perspective view of the vehicle of FIG. 1 taken from the driver side.
Figure 5:
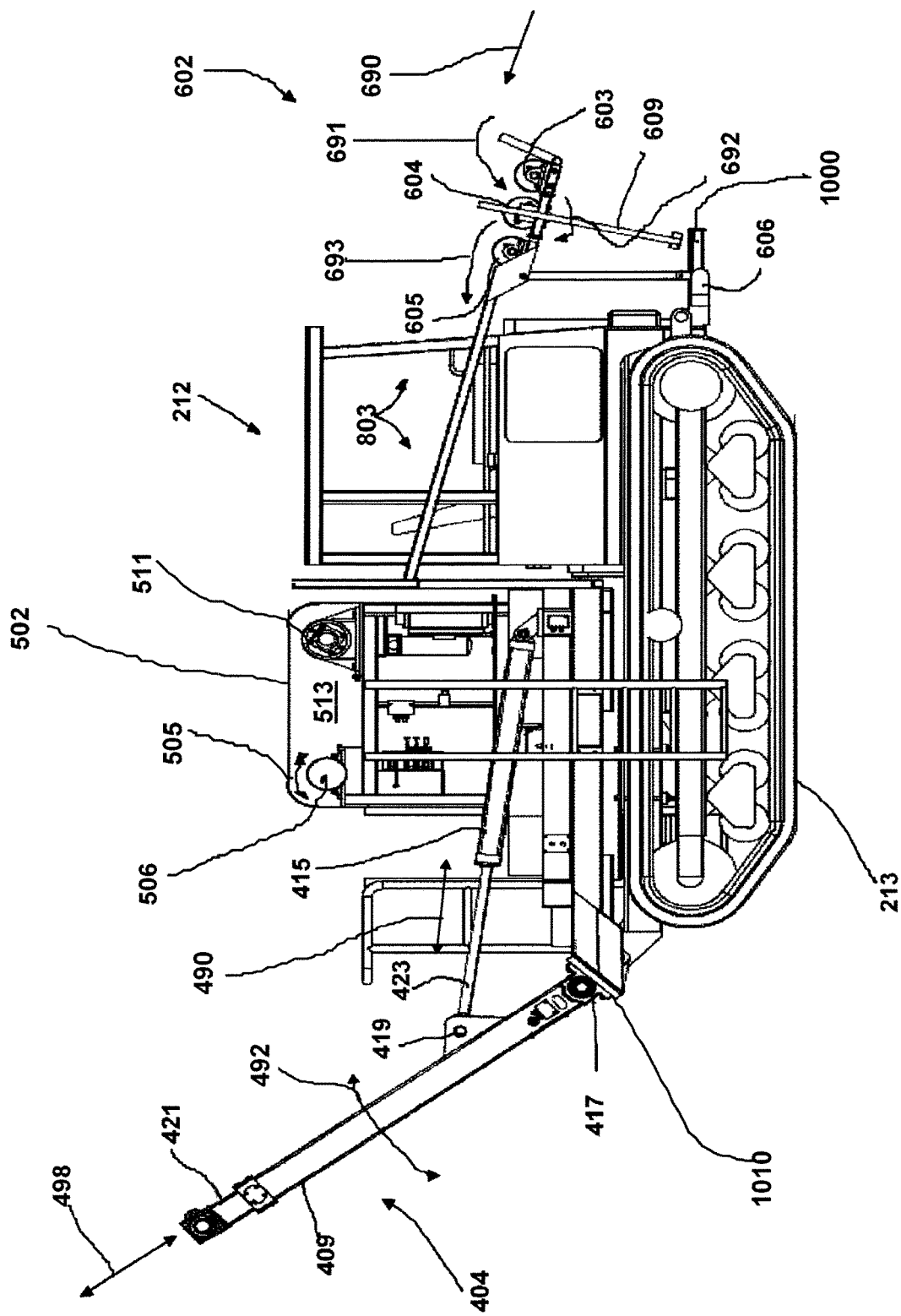
FIG. 5 is a side view of the vehicle of FIG. 1 taken from the non-driver side.
Figure 6:
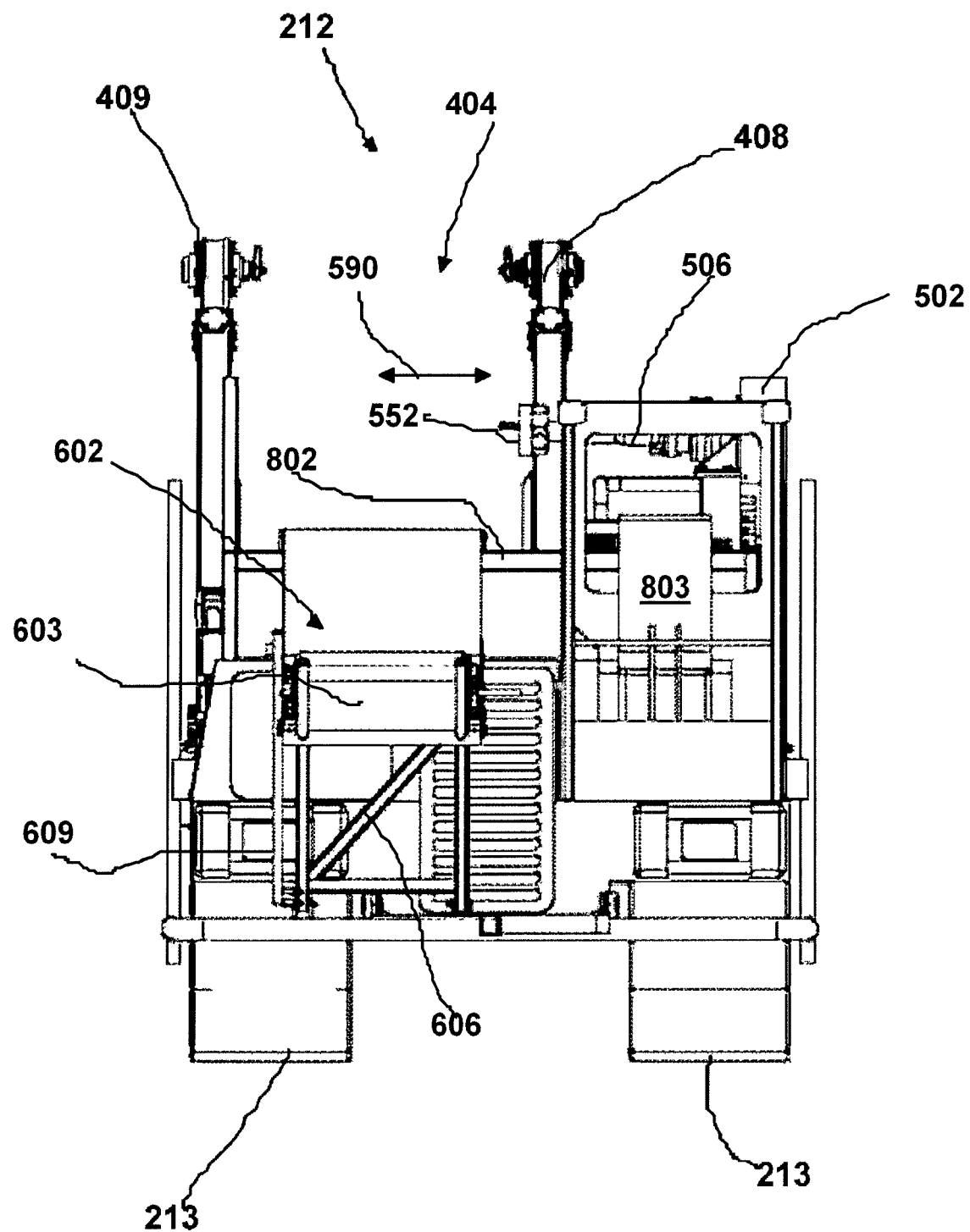
FIG. 6 is a front view of the vehicle of FIG. 1.
Figure 10:
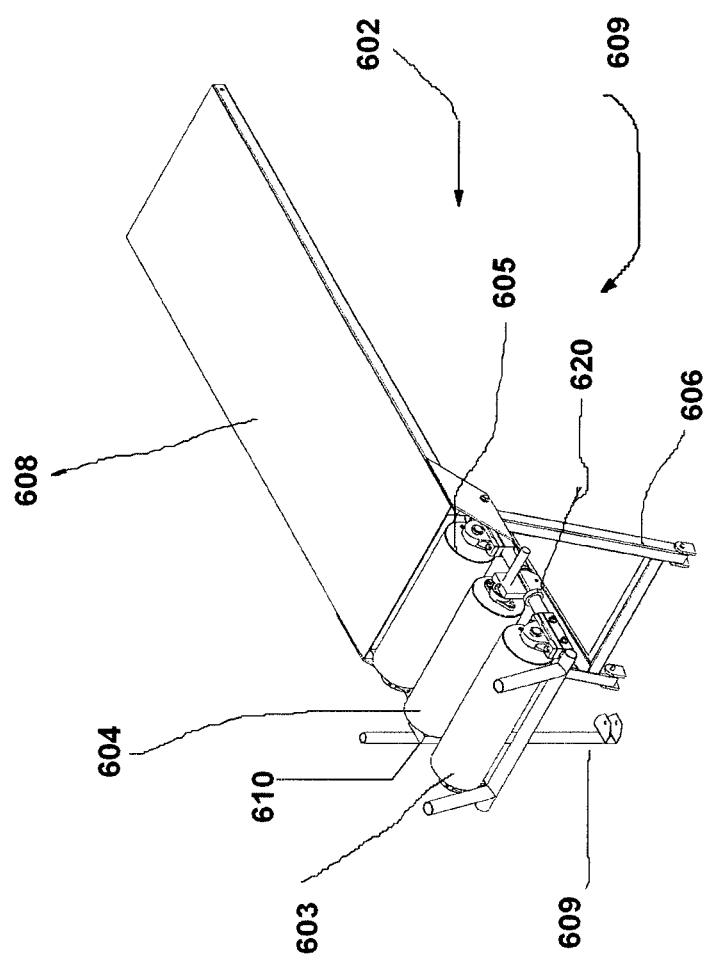
FIG. 10 is a perspective view of a portion of the take up tensioning system.
Figure 11:
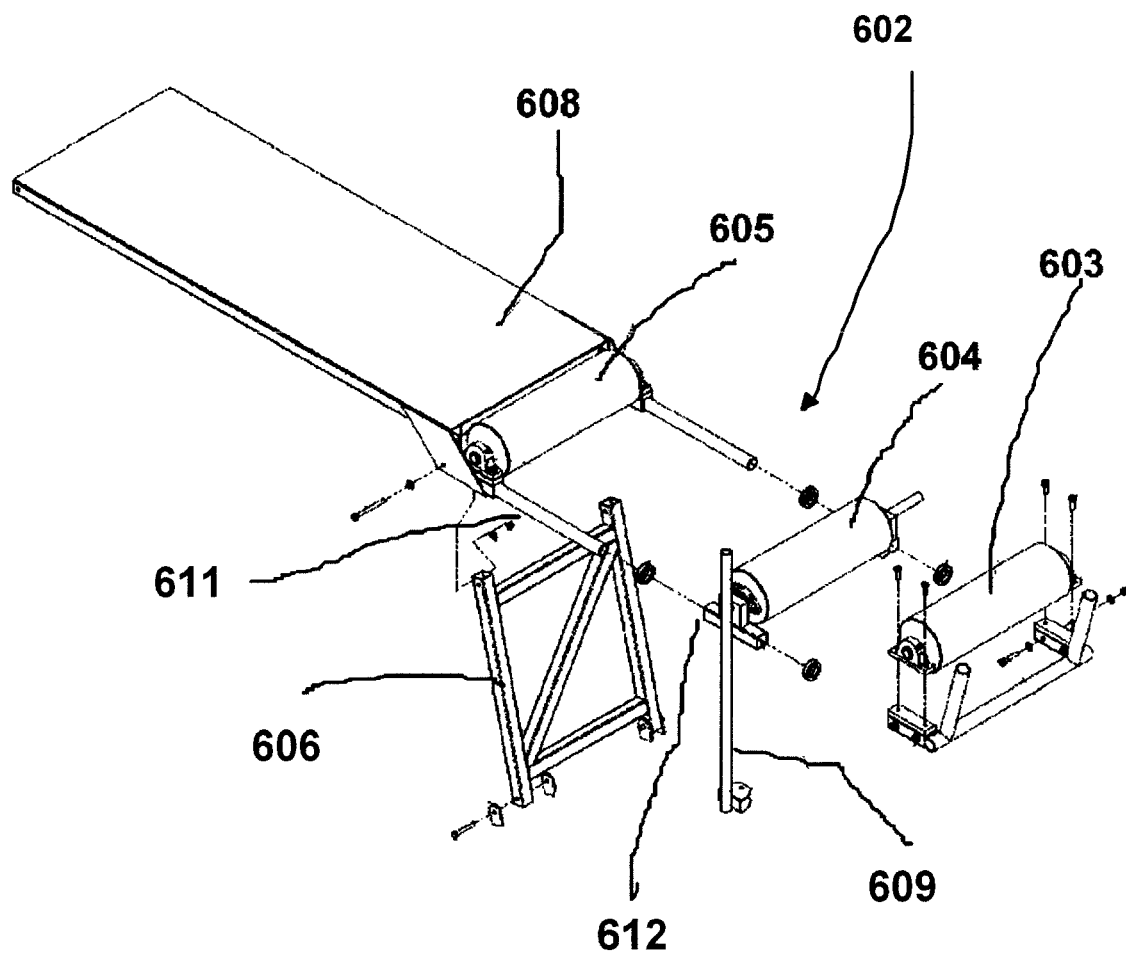
FIG. 11 is an exploded perspective view of the portion of the take up tensioning system shown in FIG. 10.
Figure 12:
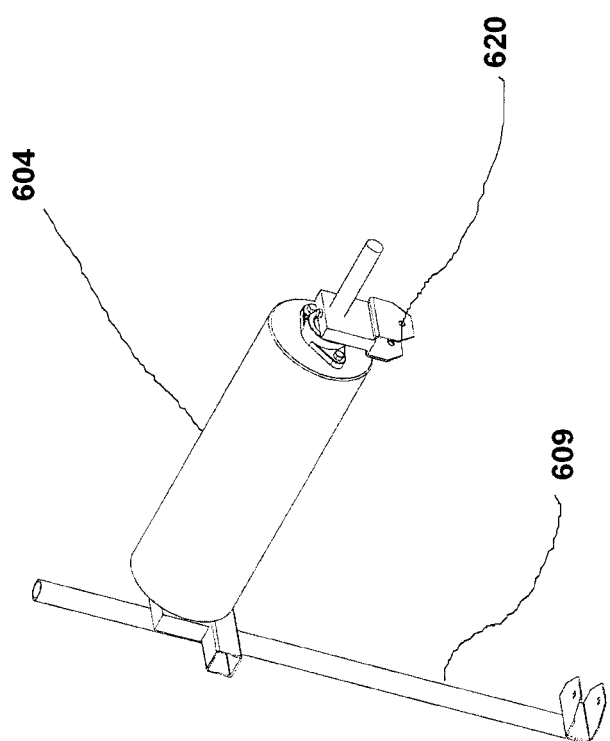
FIG. 12 is a perspective view of the articulating roller of the tensioning system.
Figure 13:
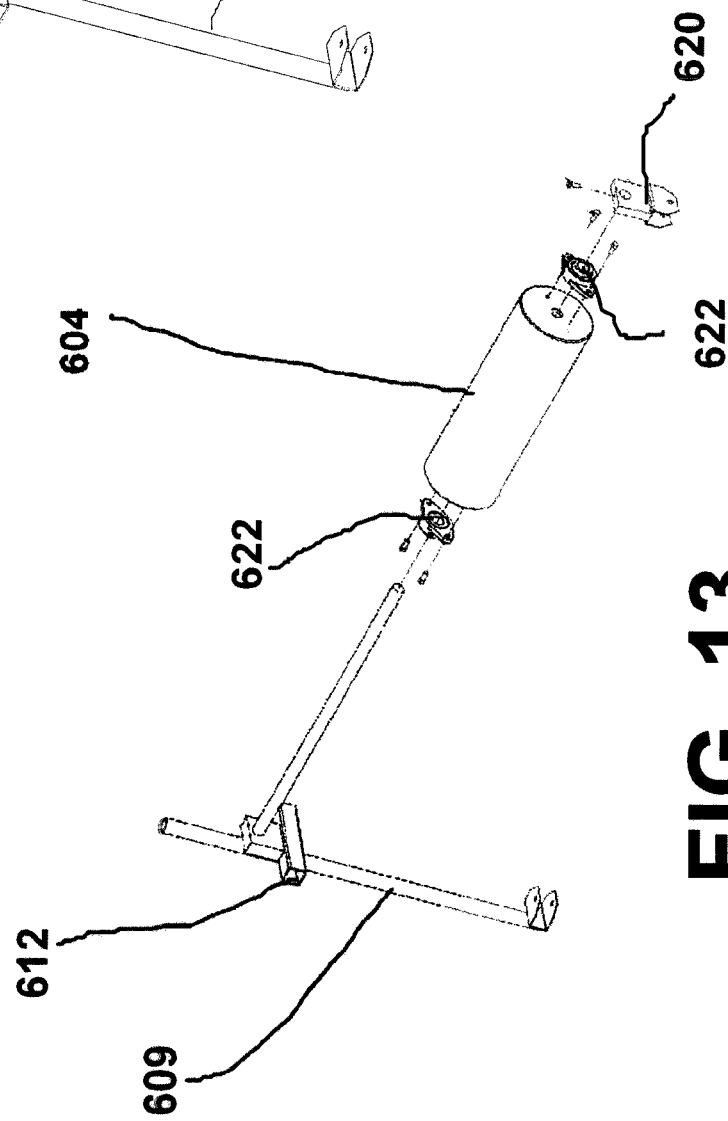
FIG. 13 is an exploded perspective view of the articulating roller of the tensioning system.
Figure 14:
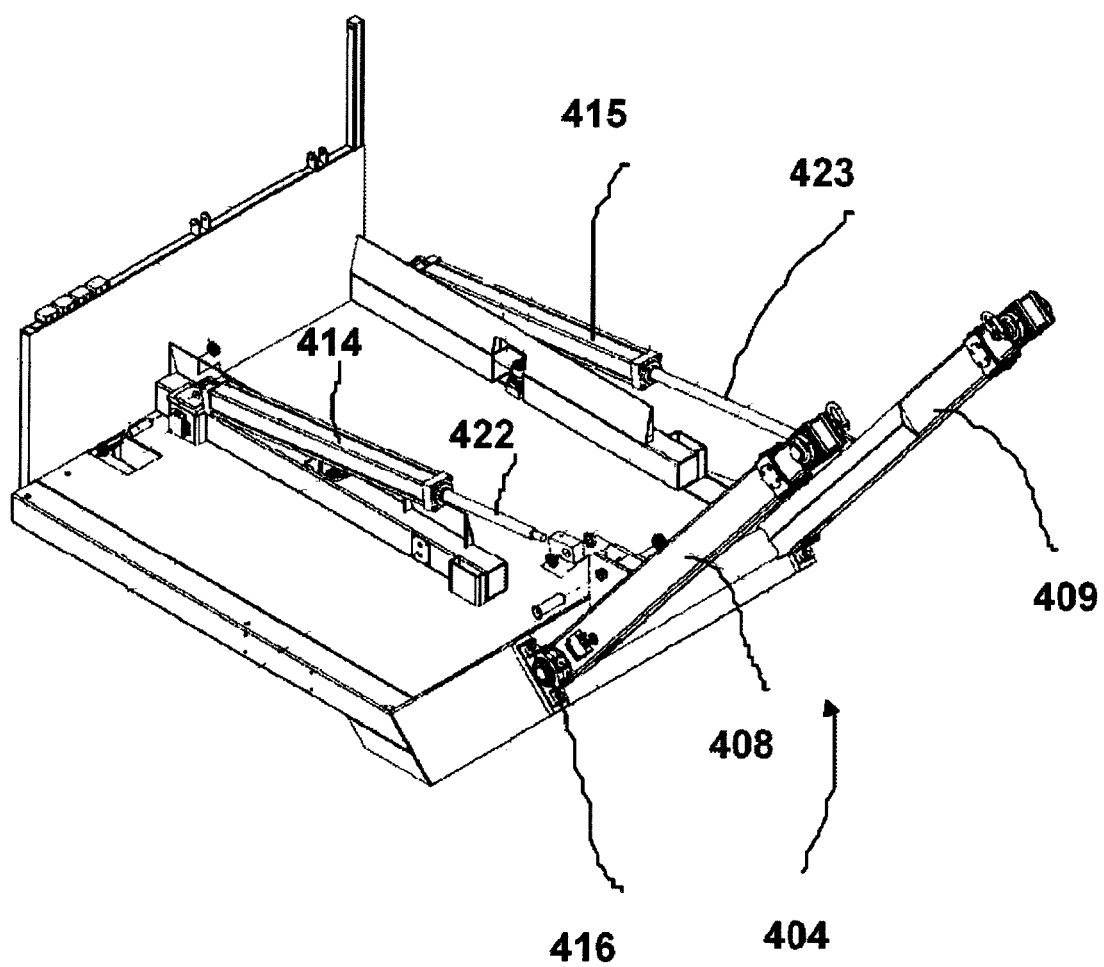
FIG. 14 is a perspective view of the reel lifting system.
Figure 15:
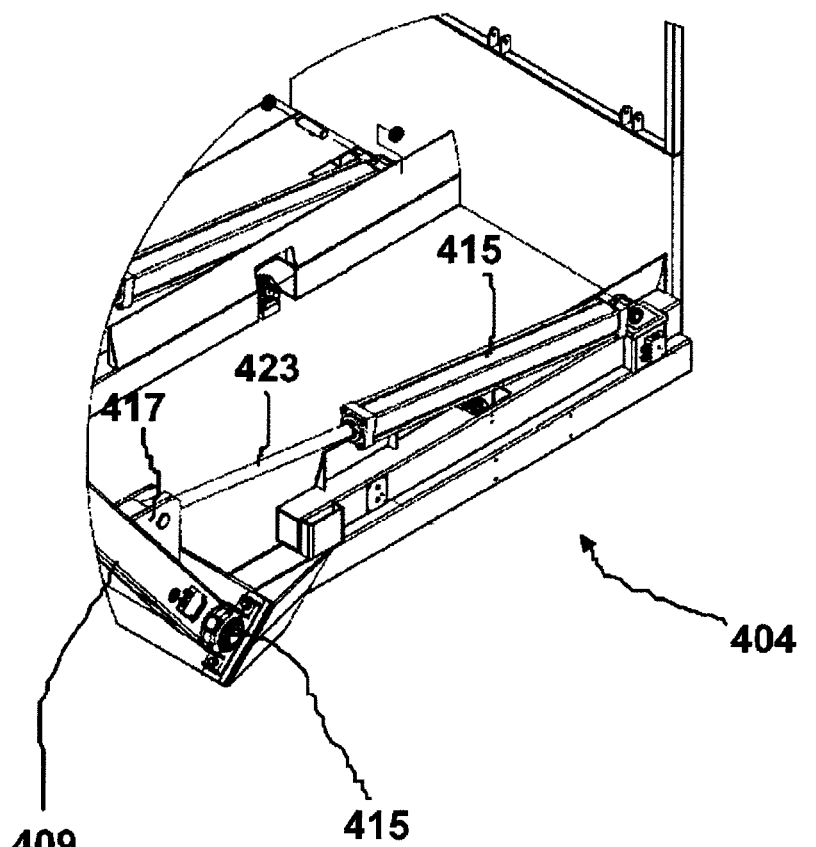
FIG. 15 is a perspective view of a hydraulic cylinder powering the reel lifting system.
Figure 16:
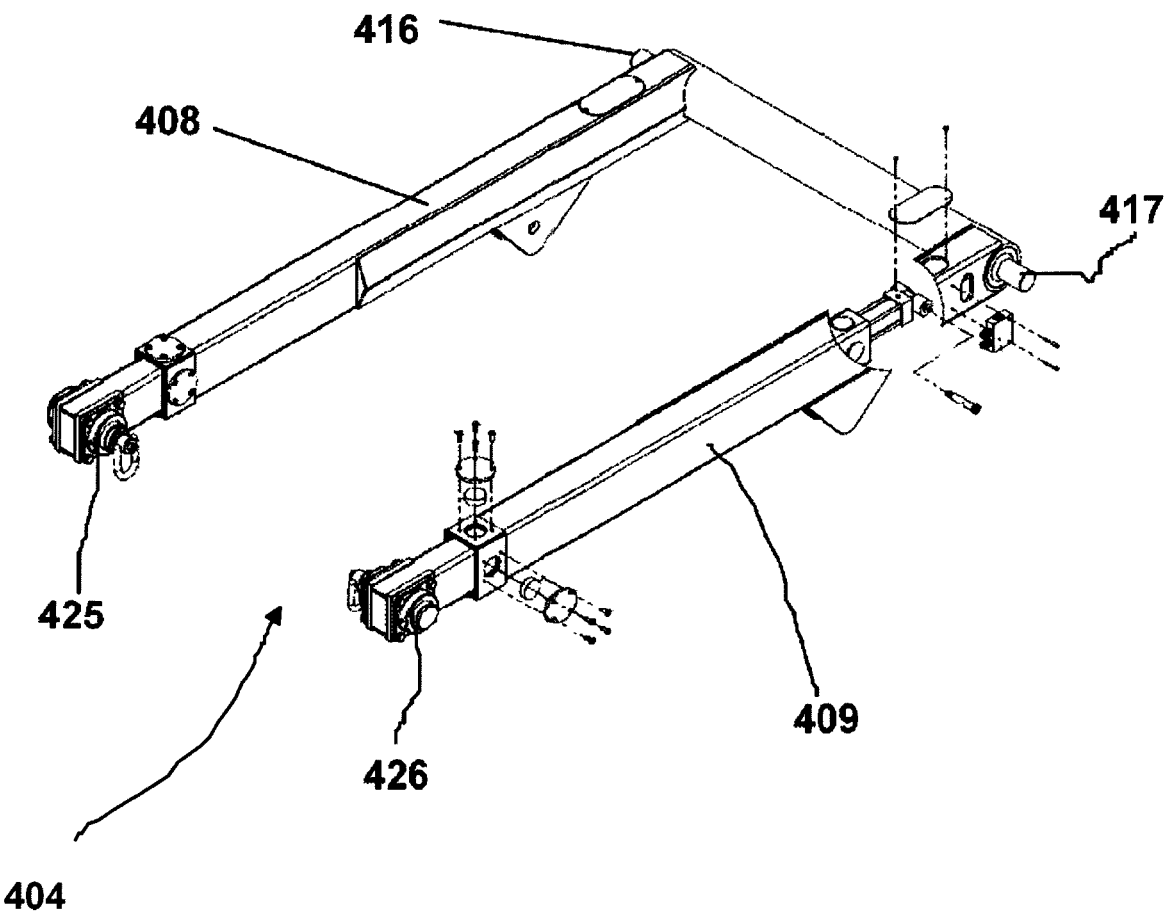
FIG. 16 is a perspective view of the two expanding and retracting articulating arms of the reel lifting system.

In one embodiment is provided a system 200 for rapidly deploying a frac water transfer system, as depicted schematically in FIG. 2. The system 200 comprises one or more segments of lay flat hose 304 wound onto one or more spools or reels 202.

The spools 300 comprise a cylindrical core and two sidewalls having a circular cross section. In one or more embodiments, the sidewalls of the spools 300 may comprise spokes 302, as illustrated in FIGS. 24-28. Each sidewall further comprises a circumferential surface.

The lay flat hose 304 may be manually wound onto the spools 202. The lay flat hose 304 may comprise a first end 306 and a second end 312. The second end 312 of the lay flat hose 304 is attached to the cylindrical core or drum 308 of the spool 302 such that the end 312 will rotate along with and at substantially the same rate as the drum 308 of the spool 300.

In various embodiments, each end 306, 312 of the lay flat hose segment 304 comprises a coupling 310. While the coupling 310 of the second end 312 may be disposed proximate the outer surface of the drum 308, and the lay flat hose 304 may be wound around both the drum 308 and the coupling 310, such an arrangement may create an irregular shaped spooling resembling an egg. To avoid the irregular shape, the coupling 310 of the second end 312 may be disposed within the drum 308 (see FIG. 28). Disposing the coupling 310 within the drum 308 further connects and anchors the second end 312 to the spool 300.

In one embodiment, a crank (not shown) that rotates the drum 308 of the spool 300 (or it may be turned manually), thereby rotating and winding the lay flat hose 304 around the drum 308 of the spool 300. Manual adjustments in alignment of the lay flat hose 304 may be necessary to reduce tangling and ensure that the desired length of lay flat hose 304 fits within the spool's 300 carrying capacity. The number of spools 300, 300', 300", etc. necessary depends on the desired or required total length of lay flat hose 304, which is determined, in part, by surveying the path from the water source 208 to the destination 210.

Reel Drive System

In various embodiments a drive system 502 may be used to facilitate winding the segments of lay flat hose 304 onto the spools 300 during take up of lay flat hose 304. For example, drive system 502 may comprise a shaft fitted with friction rollers. The friction rollers may be spaced such that each friction roller aligns with and engages a circumferential surface of a sidewall of the spool 300. A power source in communication with a motor may rotate the shaft, and consequently rotate the friction rollers, in one direction, causing the spool 300 to rotate in the opposite direction. The drive system may thus replace the manual crank system described above for winding the segments of lay flat hose 304 onto the spools 300.

Figure 19:
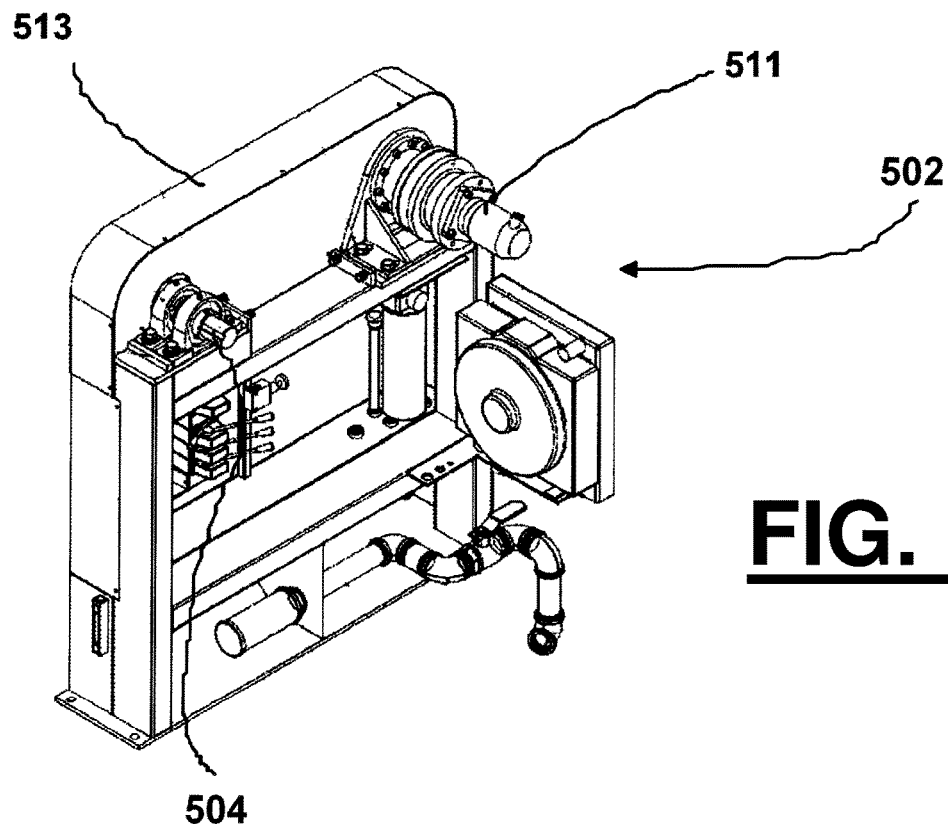
FIG. 19 is a perspective view of the reel rotating and tensioning system.
Figure 20:
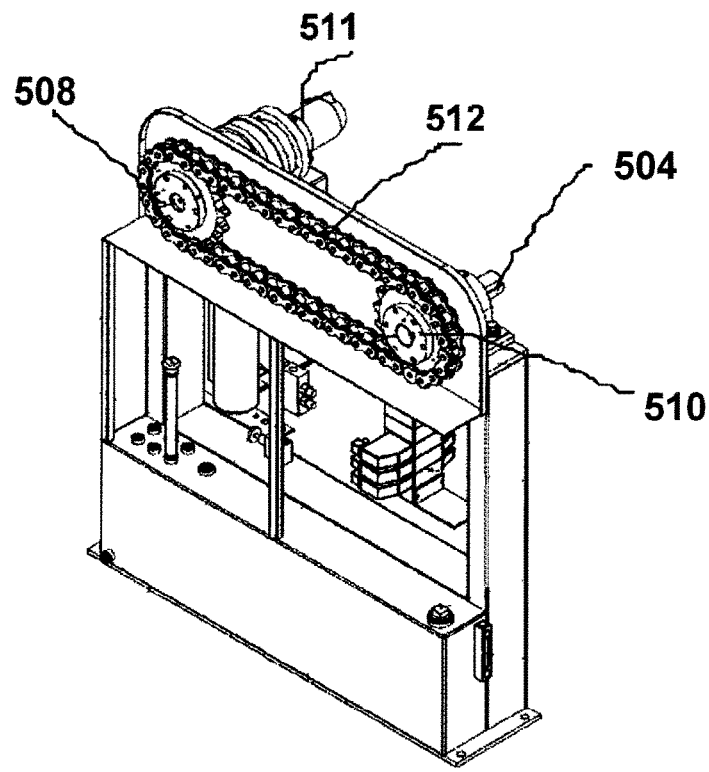
FIG. 20 is a perspective view of the reel rotating and tensioning system shown from the opposite side as FIG. 19.
Figure 28:
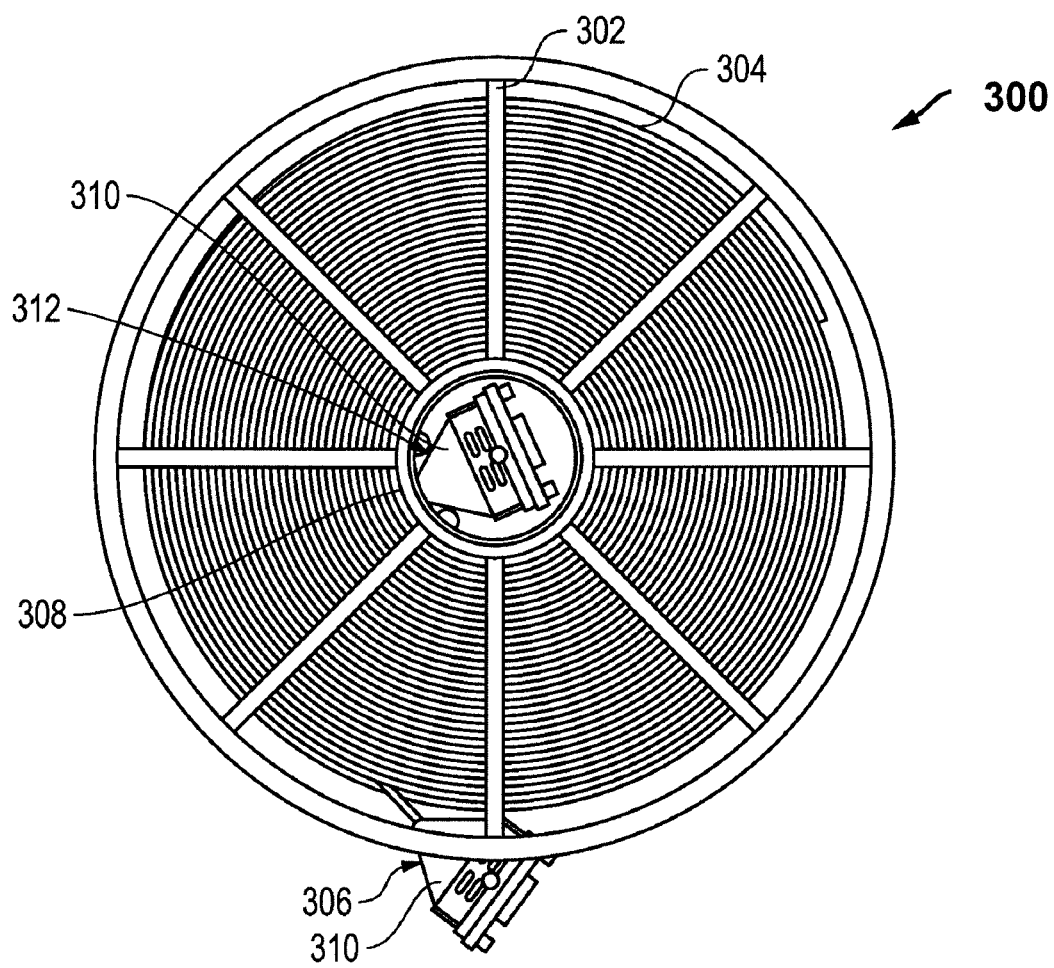
FIG. 28 is side view of a reel loading with a lay flat hose.

FIG. 19 is a perspective view of the reel rotating and tensioning system 502. FIG. 20 is a perspective view of the reel rotating and tensioning system 502 shown from the opposite side as FIG. 19. FIG. 21 is a perspective view of the motor 511 powering the reel rotating and tensioning system 502. FIG. 22 is a perspective view of the motor 511 powering the reel rotating and tensioning system taken from the opposite side as FIG. 21. FIG. 23 is an exploded perspective view of the sliding connection between the reel rotating and tensioning system of FIG. 21 and the reel.

An axle drive subsystem 502 of the crawler 212 may comprise a drive shaft 504 that engages a connection 330 of the spool 300. The opposing end of the drive shaft 504 that does not engage the spool connection 330 may be fitted with a second gear 510 (driven gear). The second gear's 510 rotation correspondingly rotates the connection 330 and the spool 300 in the same direction.

A first gear 508 (drive gear) may be substantially aligned in a parallel configuration with the second gear 510. A motor 511 may be used to rotate the first gear 508. The teeth of the gears 508, 510 may mesh in order to transmit the motor's torque. Alternatively, the second gear 510 may be spaced apart from the first gear 508 and a chain 512 may be used to transmit rotary motion from the first gear 508 to the second gear 510. Guard 513 can cover gears 508, 510 and chain 512. Unlike the meshing configuration in which the gears 508, 510 rotate in opposite directions, the drive chain transmits rotary motion such that the gears 508, 510 rotate in the same direction. Because the second gear's 510 rotation correspondingly rotates the spool 300 in the same direction, spool 300 rotates in the same direction as the second gear 510 and motor 511. Rotation of spool 300 in one direction may lay lay flat hose 304, and rotation of spool 300 in the opposite direction may take up or retrieve lay flat hose 304.

A detachable connection can be made between reel 300 and axle drive subsystem 502. FIG. 23 is an exploded perspective view of the sliding connection 520 between the reel rotating and tensioning system 502 and the reel 300. This slidable connection 520 can include first end 522 and second end 524 having first section 530 which accepts telescoping second section 540. Arrows 590 schematically indicate the ability of first section 530 to slide relative to second section 540, however, first and second sections are rotationally locked relative to each other so that rotation of second section causes rotation of first section 530. First end 522 can be coupled to drive axle 504 of subsystem 502. Second end 524 can be coupled to spool 300. Spool 300 can rotate relative to its support base 350. When connected by second end 524, rotation of telescoping connection 520 causes rotation of spool 300 relative to base 350.

Tensioning System for Hose Reel

A tensioning subsystem 602 is provided for the crawler 212 in accordance with various embodiments of the invention. The tensioning subsystem 602 may comprise a plurality of rollers 603, 604, 605 (see FIGS. 1-13 and 47-50). The lay flat hose 304 may engage the rollers 603, 604, and 605 in an alternating over-and-under configuration.

The second end 312 of the lay flat hose 304 may be connected to the spool 300 so that the lay flat hose may be retrieved. The axle drive subsystem 502, described above with reference to FIG. 5, may rotate the spool 300 in either direction to retrieve and wind the lay flat hose 304 onto the spool 300.

As the lay flat hose 304 passes through the rollers 603, 604, and 605 of the tensioning subsystem 602, rotational forces on reel 300 from axial shaft 506 cause tensile forces to act upon the lay flat hose 304, flattening the lay flat hose 304 and ensuring that it is neatly and tightly wound onto the spool 300. Further, because the tensioning subsystem 602 flattens the lay flat hose 304, fluid is thereby squeezed out and removed from the lay flat hose 304. This water removing effect may efficiently dry the lay flat hose 304 and allows it to be readily deployed for further use or stored for later use. In various embodiments, the rollers 603, 604, and 605 of the tensioning subsystem 602 may be disposed towards the front of the crawler 212 to facilitate retrieval or take up of the lay flat hose 304 while the crawler 212 is moving in a forward direction.

The rollers 603, 604, and 605 may be disposed at a height above the ground sufficient to vertically lift the lay flat hose 304 off the ground to reduce any wear and tear of the lay flat hose 304 that may otherwise occur by its scraping against the ground during retrieval along with also facilitating removal of water from the vertically lifted portion of the lay flat hose.

Figure 40:
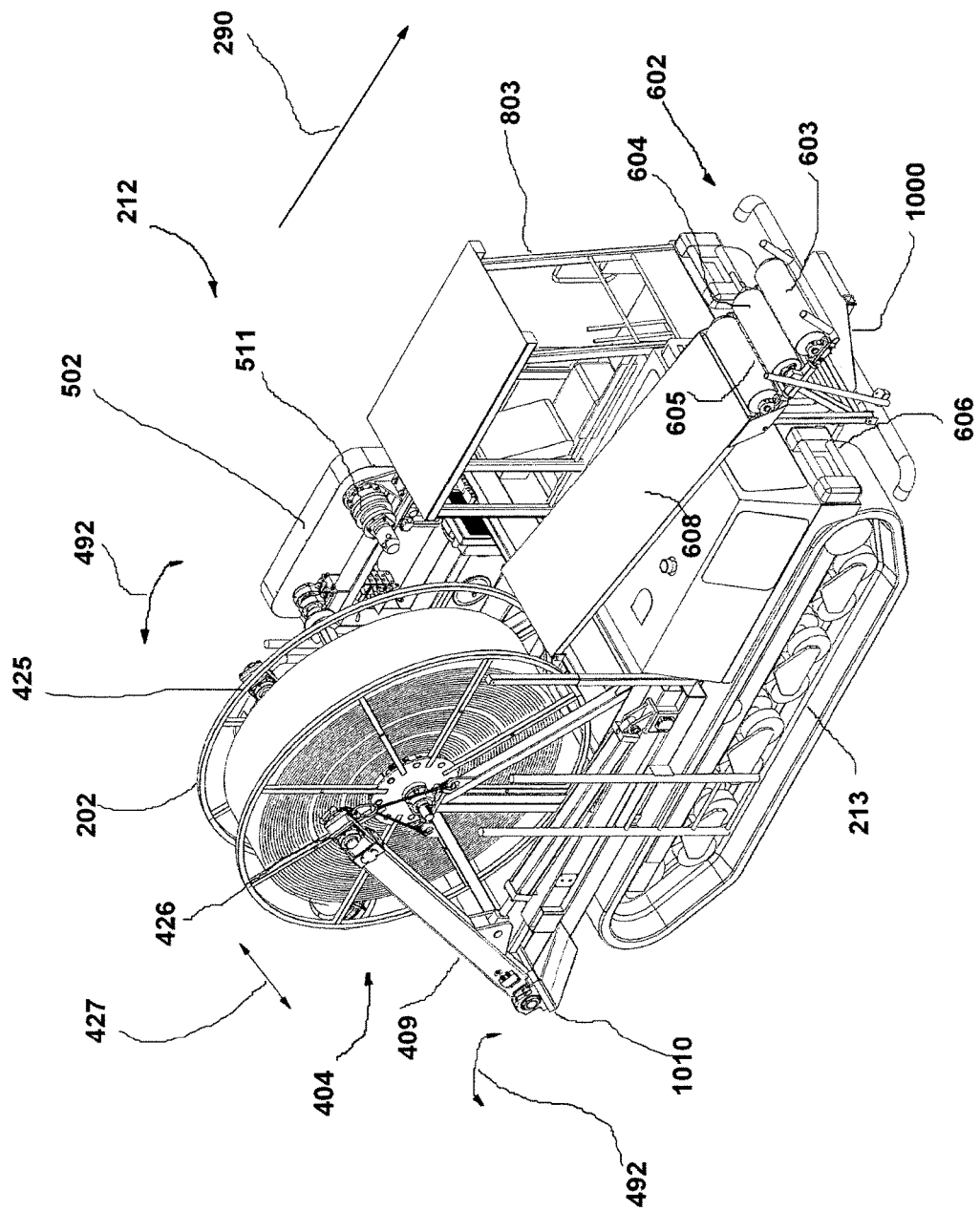
FIG. 40 is front perspective view from the non-driver side of the vehicle of FIG. 1 shown with a loaded reel.
Figure 41:
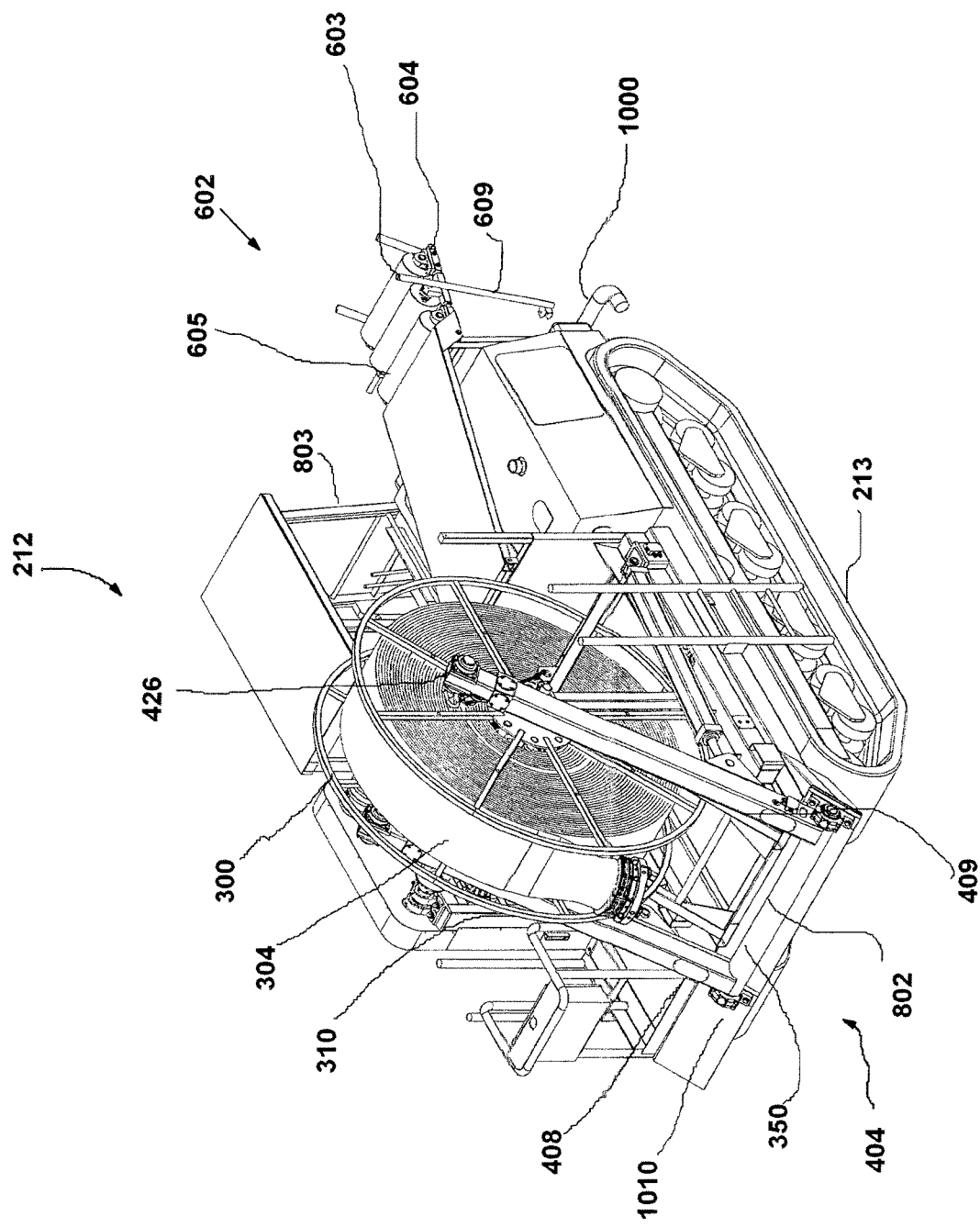
FIG. 41 is rear perspective view from the non-driver side of the vehicle of FIG. 1 shown with a loaded reel.
Figure 42:
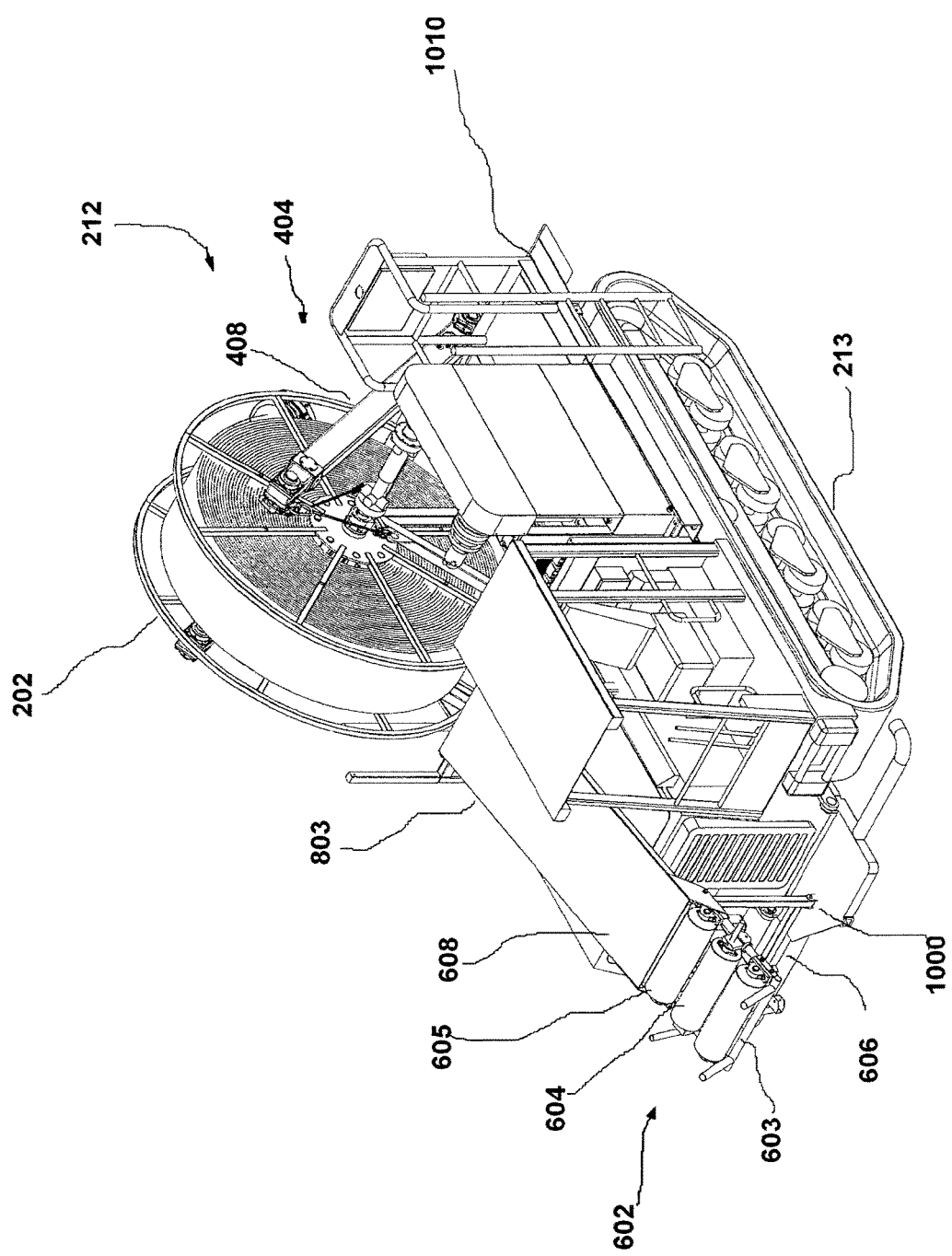
FIG. 42 is front perspective view from the driver side of the vehicle of FIG. 1 shown with a loaded reel.
Figure 43:
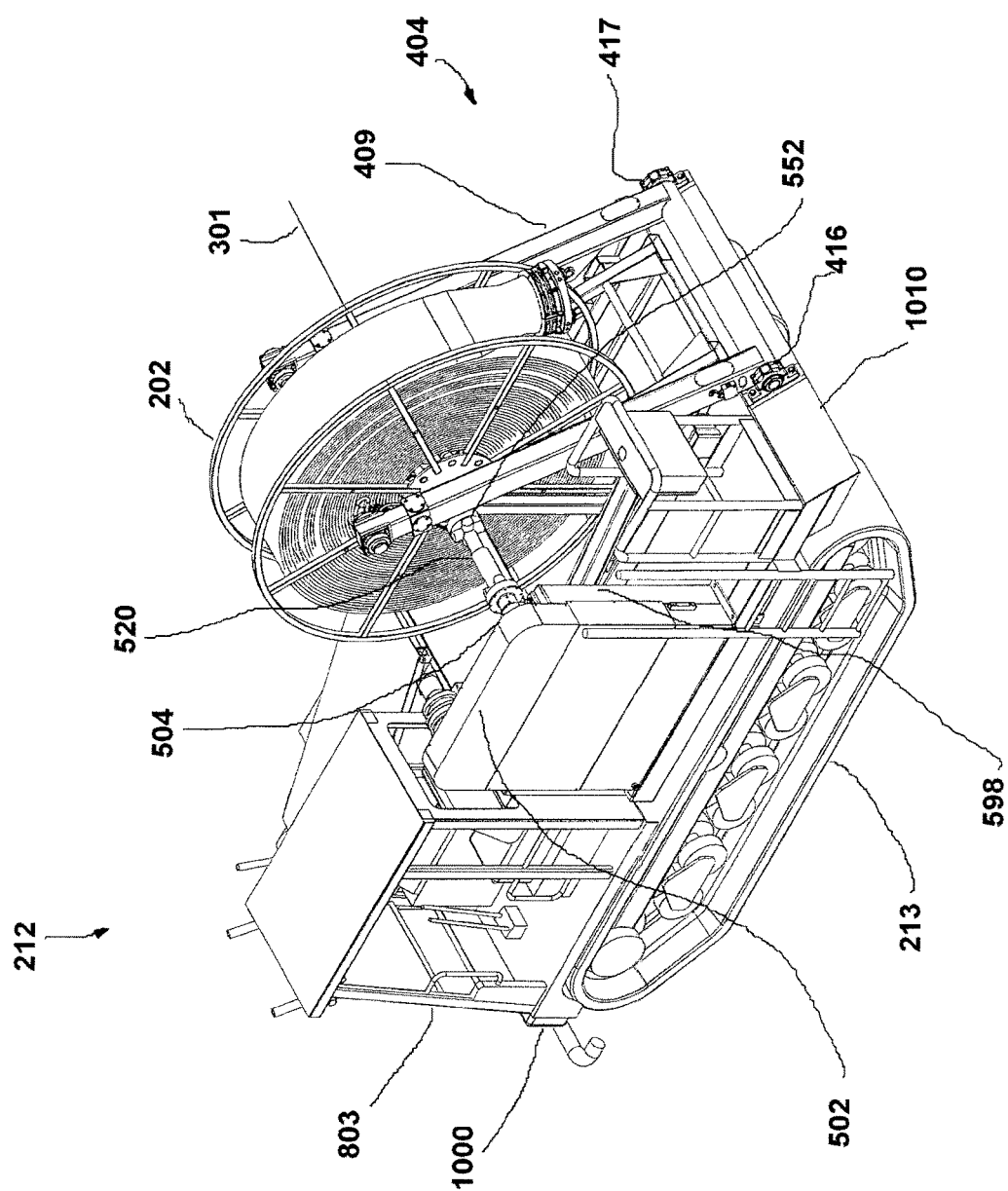
FIG. 43 is rear perspective view from the driver side of the vehicle of FIG. 1 shown with a loaded reel.

In various embodiments, the tensioning subsystem 602 may comprise one roller 604 (see FIG. 40) or two rollers 603, 604.

The rollers 603, 604, and 605 may be closely spaced and have parallel axes. The axes of the rollers 603, 604, and 605 may also be parallel to the axis 301 of the spool 300. The rollers 603, 604, and 605 may be aligned laterally with respect to each other and the spool 300 such that, when the lay flat hose 304 is retrieved, the lay flat hose 304 is pulled longitudinally towards the spool 300 and wound onto the spool 300.

Middle roller 604 may be pivotally connected to support structure 606. As shown in FIGS. 10-13, middle roller 604 can have a handle 609 to facilitate selective pivoting of roller 604 relative to rollers 603 and 605.

The first end 306 of the lay flat hose segment 304 is the end that is first unwound and offloaded from the spool 300 as the spool 300 is rotated by the axial drive subsystem 502. The second end 312 of the lay flat hose 304 is the end that is last unwound and offloaded from the spool 300. The lay flat hose segment 304 may be manually positioned as it unwinds from the spool 300 to ensure placement of the lay flat hose segment 304 suitable for connecting the first end 306 of the lay flat hose segment to the second end 312 of the previously laid lay flat hose segment 304.

In various embodiments, the spools 300 of lay flat hose 304 may be provided with one or more support structures, frames, or "skids" 350. The skids 350 allow for a completely self-contained modular system comprising one or more spools 300 of lay flat hose 304. Each skid or frame or support 350 may further comprise one or more legs for maintaining the skids in a position suitable for facilitating the loading and offloading of the spools 300 onto and from the skids. Moreover, the legs may facilitate the loading and offloading of the skids 350 onto and from a vehicle or a trailer towed by a vehicle. Each skid or frame or support 350 may further comprise a lifting mechanism allowing for the skid or frame to be self-supported.

Getting Reels to and/or from Stages Locations/Pre-Staging Reels for Layout or Take Up The spools 300 (or combination of spool 300 and base 350) may be pre-staged at predetermined positions at which lay flat hose 304 will be needed between the one or more water sources 208 and the one or more destinations 210 to avoid deadheading. The pre-staging positions may be determined based on the terrain parameters gathered from the survey and the output data of the computer program product 224.

The skids or frames 350 may be loaded onto one or more conveyance vehicles 204. Any type of conveyance vehicle 204 suitable for carrying skids or heavy equipment may be used, including, but not limited to: a rollback trailer with a hydraulic lift, a flatbed trailer with a portable forklift, or a flatbed trailer with a knuckle-boom crane. The skids or frames may be lifted and loaded onto the conveyance vehicle 204 manually or with the aid of machinery suitable for lifting heavy equipment. For example, a forklift or a crane may be used to lift the skids onto the conveyance vehicle 204. In one or more embodiments of the present invention, the spools 300 may be loaded directly onto the conveyance vehicle 204 without the use of skids. It is to be understood that the present invention envisions the conveyance of modules of multiple spools 300 loaded onto skids and/or spools 300 without skids. The conveyance vehicle 204 onto which spools 300 are loaded may be a 48 ft. flatbed trailer with the capacity to carry about 14 spools 300, approximately 1.25 mi. of lay flat hose 304. The use of a flatbed trailer may comply with Department of Transportation (DOT) size and weight requirements. The use of a flatbed trailer as the conveyance vehicle 204 facilitates the use of a third party contractor for hauling of the load, which reduces the DOT risk exposure of the person or entity hiring the third party contractor. A desired number of spools 300 may be loaded onto the conveyance vehicle 204. The desired number of spools 300 is determined, in part, based on the total length of lay flat hose 304 needed to complete the designed pipeline 216 and on the conveyance vehicle's 204 carrying capacity.

The conveyance vehicle 204 may be driven from the equipment site 206 to the water source 208 to begin laying the lay flat hose 304 towards the frac water destination 210, i.e., the location to which water will be transported. The frac water destination 210 may be in the vicinity of the location where the frac job will be performed. Alternatively, the conveyance vehicle 204 may be driven to the destination 210, and the lay flat hose 304 may be laid towards the water source 208. Besides spools 300, the conveyance vehicle 204 may carry smaller off-road vehicles 212 and/or various other types of equipment 214 that facilitate the rapid deployment and retrieval of a frac water transfer system in accordance with embodiments of the invention. One or more conveyance vehicles 204 and/or off-road vehicles 212 may be used to transport additional spools 300 of lay flat hose 304 or other equipment 214, if necessary, to the current pipeline 216 work location.

The current pipeline 216 work location is defined herein as the vicinity of the location at which the last segment of lay flat hose 304 has been laid. The spools 300 may be offloaded from the conveyance vehicle 204 in a manner similar to that used in loading the skids onto the conveyance vehicle 204. However, a different manner of offloading the spools 300 from the conveyance vehicle 204 may be used. For example, if a forklift was used to lift and load the spools 300 onto the conveyance vehicle 204, a forklift may also be used to lift and offload the spools 300 from the conveyance vehicle 204. But the spools 300 may also be offloaded manually or with the aid of any other machinery suitable for lifting heavy equipment.

In one or more embodiments, smaller off-road vehicles 212 (see FIGS. 1-15) may be used to transport the spools 300 from the conveyance vehicle 204 to the current pipeline work location. The off-road vehicle(s) 212 may be one or more all-terrain vehicles (ATVs), each towing a trailer capable of being towed in an all-terrain environment. The vehicles 212 may position the trailer proximate a spool such that the lifting mechanism on the vehicles 212 is capable of lifting and offloading a spool 300 and lifting and loading the spool 300 onto the trailer. A vehicle (or vehicles) 212 can be positioned near work location 216 as can be a trailer carrying spools 300.

Laying Out Hose from Vehicle

The segment of lay flat hose 304 to be laid may be unwound from the spool 300. The trailer on which the spool 300 is sitting may comprise a friction roller drive mechanism (not shown) for unwinding the lay flat hose 304 from the spool 300. A shaft comprising mounted friction rollers may be in contact with the circumferential surface of the sidewalls of the spool 300. A remote hydraulic power pack may provide the source of power to rotate the shaft, thus rotating the friction rollers in the same direction. The friction rollers may comprise an outside contact surface made of a material having a high coefficient of friction. The contact of the rotating friction rollers with the circumferential surfaces of the sidewalls of the spool 300 in turn causes the spool 300 to rotate in the direction opposite of that in which the friction rollers (and correspondingly, the shaft) are rotating. As the spool 300 rotates, the lay flat hose 304 may be unwound and offloaded from the spool 300. In one or more embodiments, the drive mechanism may unwind the lay flat hose 304 from the spools 300 at a rate ranging from about 1 mph to about 4 mph.

Figure 44:
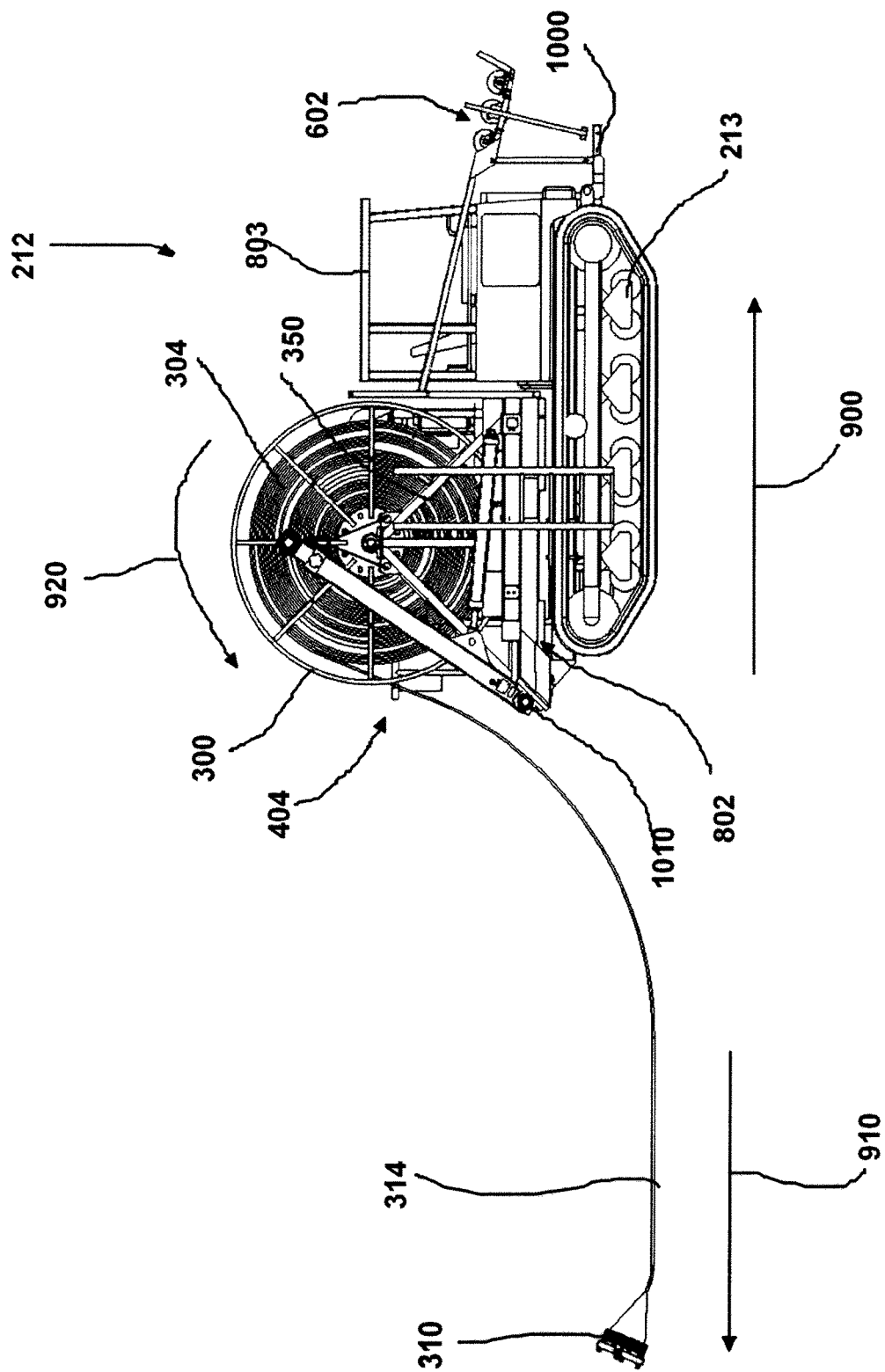
FIG. 44 is a side view of the vehicle of FIG. 1 shown laying out hose from a reel.
Figure 45:
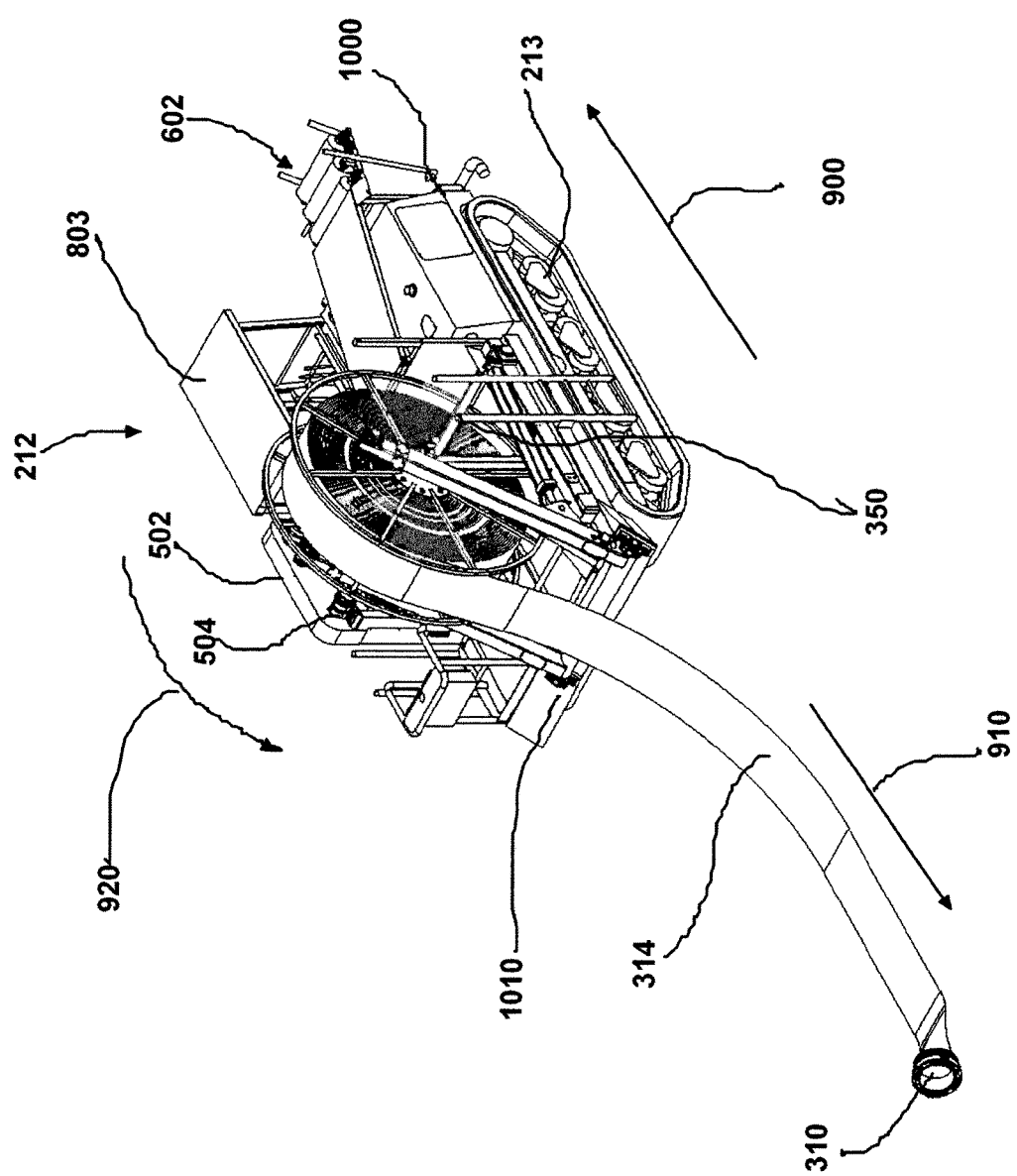
FIG. 45 is a rear perspective view of the vehicle of FIG. 1 taken from the non-driver side shown laying out hose from a reel.
Figure 46:
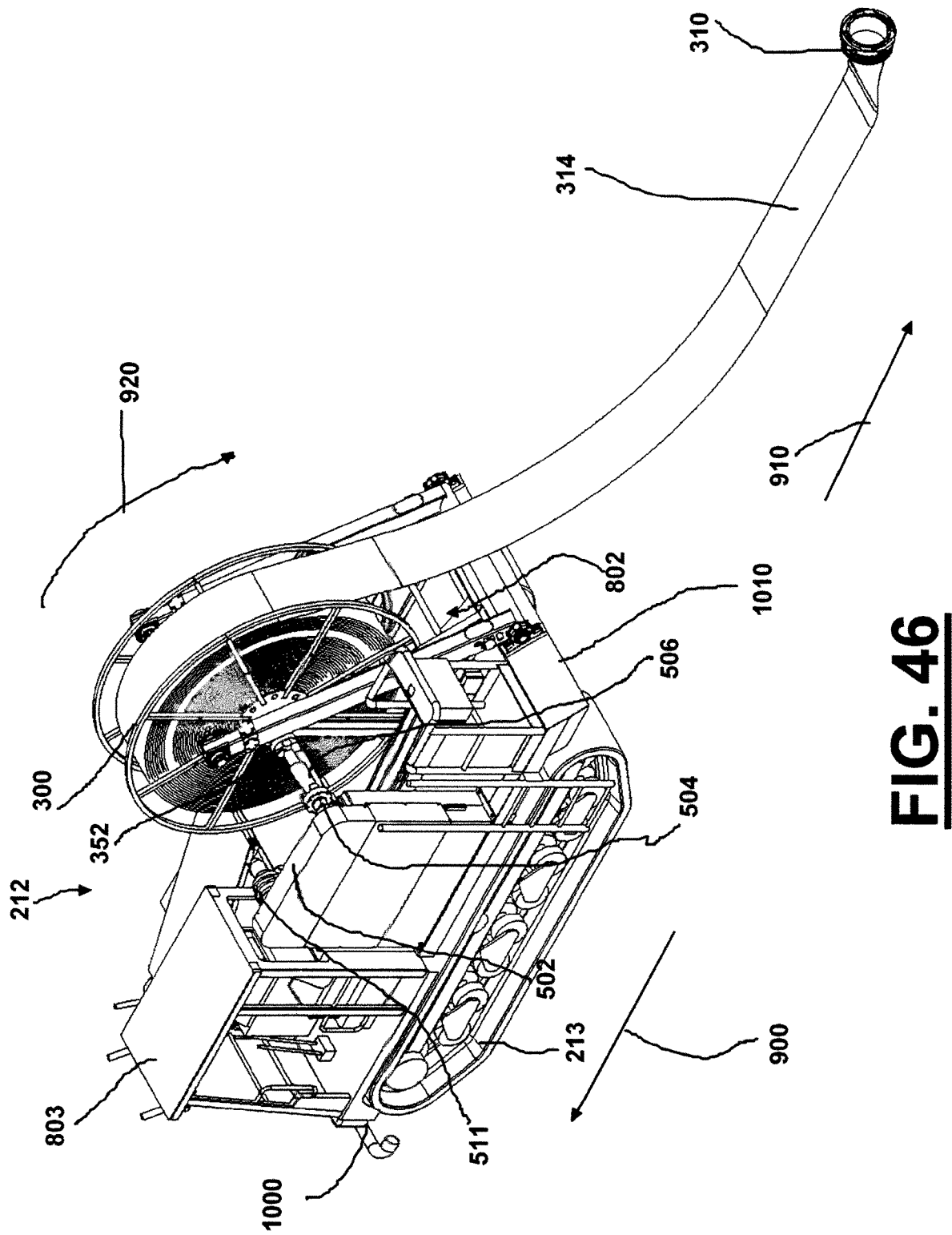
FIG. 46 is a rear perspective view of the vehicle of FIG. 1 taken from the driver side shown laying out hose from a reel.

FIG. 44 is a side view of vehicle 212 shown laying out hose 304 from a reel 300. In this figure it is shown that hose 304 is being laid out from the rear or second end 1010 of vehicle 212. FIG. 45 is a rear perspective view of vehicle 212 taken from the non-driver side shown laying out hose 304 from reel 300. FIG. 46 is a rear perspective view of vehicle 212 taken from the driver side shown laying out hose from a reel.

As section 314 of hose lays on the ground and vehicle 212 moves in the direction of arrow 900 hose 304 is impart torsional forces on reel 300 causing reel 300 to tend to rotate in the direction of arrow 920. During this process drive axle subsystem 502 is coupled to reel 300, and motor 511 can provide a braking action against free spinning of reel 300. Depending on the speed of vehicle 212 in the direction of arrow 900, operator can selectively control the rate of rotation of axle drive subsystem 502 (and thereby reel 304) to prevent over-spinning of reel 300 and allowing the flat laying of lay flat hose 304 in the direction of arrow 910.

Taking Up Previously Layed Out Hose

Figure 47:
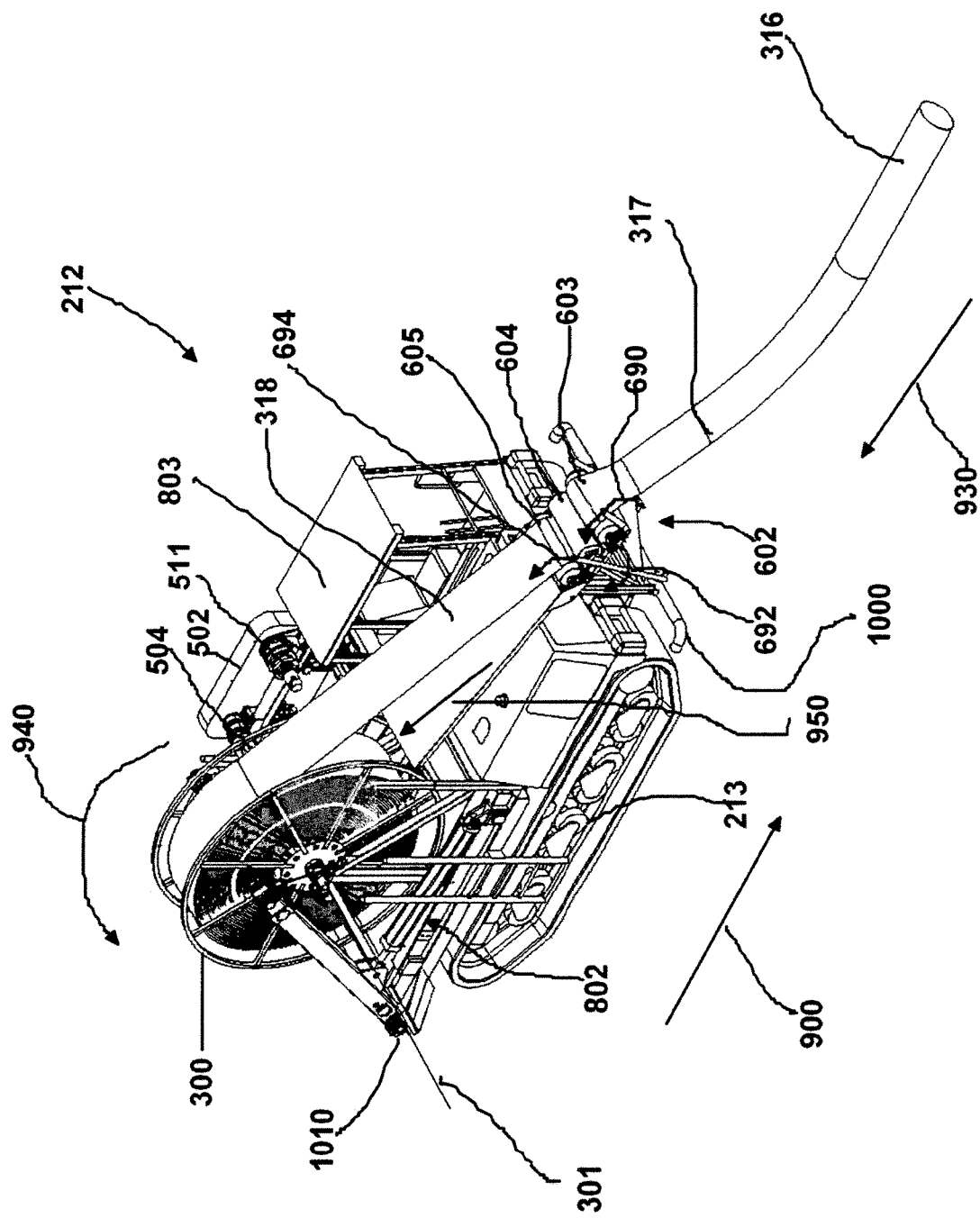
FIG. 47 is a front perspective view of the vehicle of FIG. 1 taken from the non-driver side showing the taking of hose from the ground.
Figure 48:
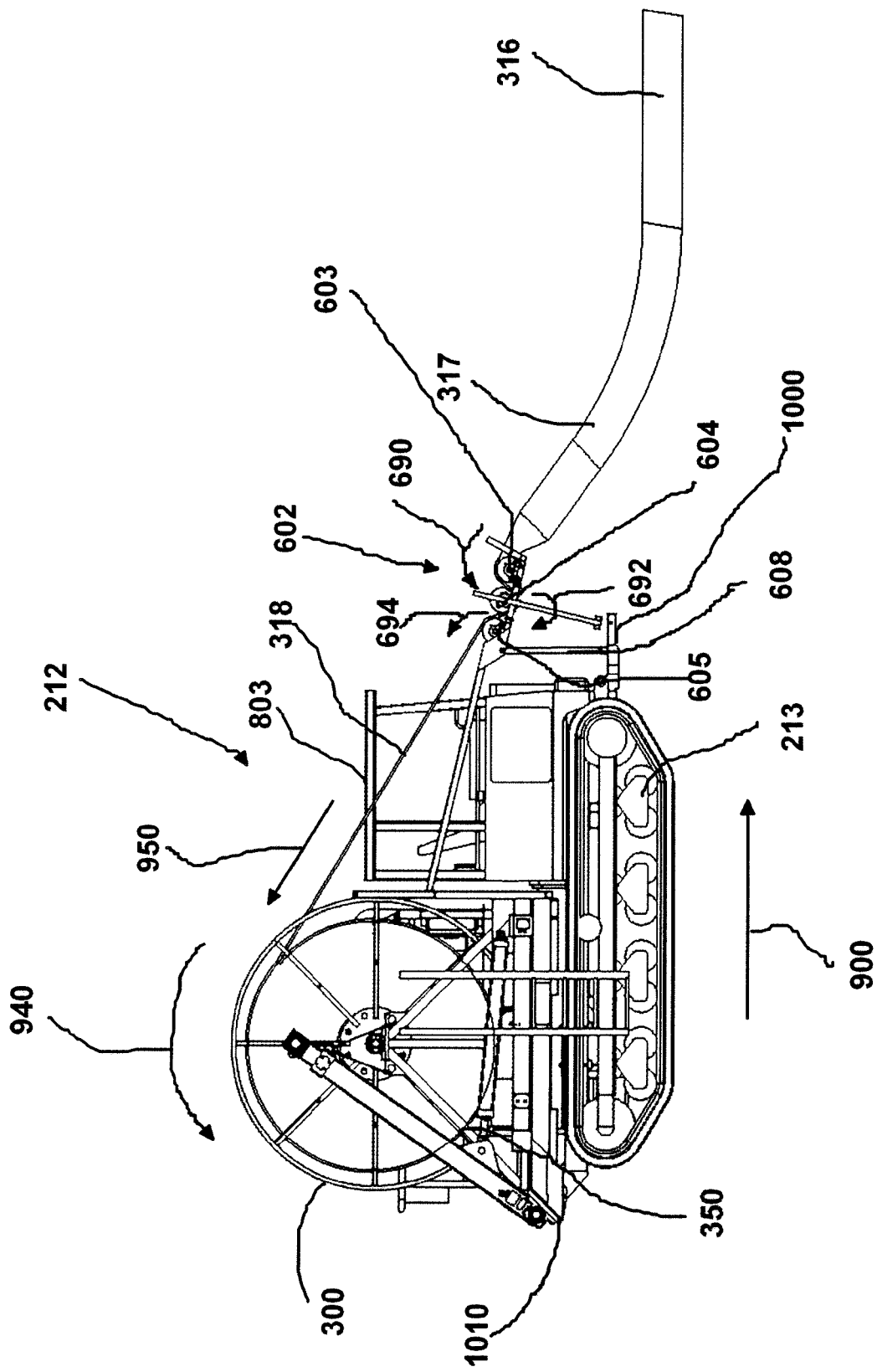
FIG. 48 is a side view of the vehicle of FIG. 1 showing the taking up of hose from the ground.
Figure 51:
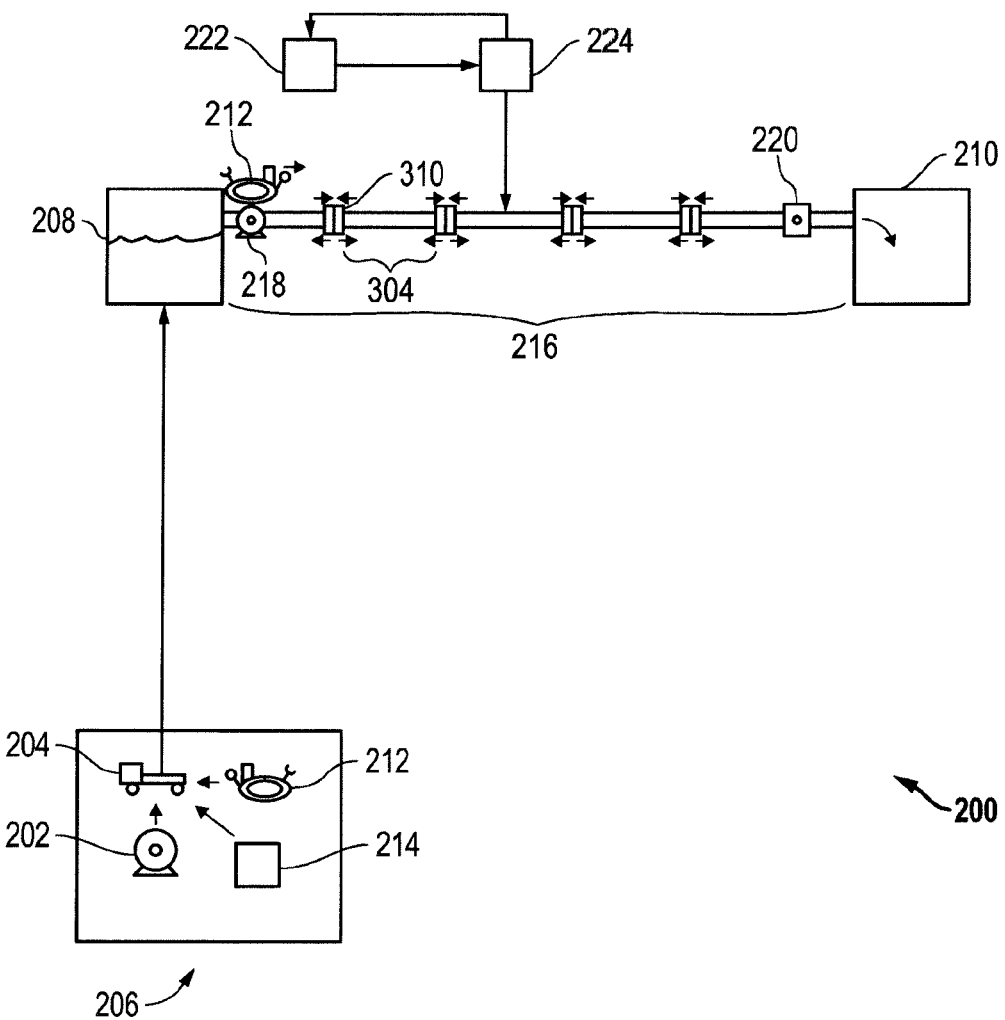
FIG. 51 is a schematic diagram of one embodiment of the method incorporating the vehicle of FIG. 1.

FIG. 47 is a front perspective view of vehicle 212 taken from the non-driver side showing the taking up of hose 304 from the ground. FIG. 48 is a side view of vehicle 212 showing the taking up of hose 304 from the ground. FIG. 49 is a front perspective view of vehicle 212 taken from the driver side showing the taking up of hose 304 from the ground.

As section 314 of hose is taken up from the ground and vehicle 212 moves in the direction of arrow 900 axle drive subsystem 502 imparts torsional forces on reel 300 causing reel 300 to tend to rotate in the direction of arrow 940. During this process drive axle subsystem 502 is coupled to reel 300, and motor 511 can over-rotate reel 300 to maintain tension in hose 318 and assist in removal of water from section 317 of hose being taken up. Depending on the speed of vehicle 212 in the direction of arrow 900, operator can selectively control the rate of rotation of axle drive subsystem 502 (and thereby reel 304) to maintain over rotation of reel 300 and tension in hose section 318, and pick up hose section in the direction of arrow 950 and allowing a dewatered and flat section of lay flat hose 304 to be wound onto reel 300.

During the take up process tensioning subsystem 602 comprising plurality of rollers 603, 604, 605 engages lay flat hose 304 in an alternating over-and-under configuration (arrows 690, 692, and 694 schematically indicate such over and under engagement). As the lay flat hose 304 passes through the rollers 603, 604, and 605 of the tensioning subsystem 602, rotational forces on reel 300 from axial shaft 506 cause tensile forces to act upon the lay flat hose 304, flattening the lay flat hose 304 and ensuring that it is neatly and tightly wound onto the spool 300. Further, because the tensioning subsystem 602 flattens the lay flat hose 304, fluid is thereby squeezed out and removed from the lay flat hose 304. This water removing effect may efficiently dry the lay flat hose 304 and allows it to be readily deployed for further use or stored for later use. In various embodiments, the rollers 603, 604, and 605 of the tensioning subsystem 602 may be disposed towards the front of the crawler 212 to facilitate retrieval or take up of the lay flat hose 304 while the crawler 212 is moving in a forward direction.

The rollers 603, 604, and 605 may be disposed at a height above the ground sufficient to vertically lift the lay flat hose 304 off the ground to reduce any wear and tear of the lay flat hose 304 that may otherwise occur by its scraping against the ground during retrieval along with also facilitating removal of water from the vertically lifted portion of the lay flat hose.

As shown in FIGS. 49 and 50, middle roller 604 may be pivotally connected to support structure 606. As shown in FIGS. 10-13, middle roller 604 can have a handle 609 to facilitate selective pivoting of roller 604 relative to rollers 603 and 605. Pivoting middle roller 604 allows end coupling 310 to pass through tensioning system 602.

Vehicle

Vehicle(s) 400 may be tracked carriers or "crawlers" 212 as illustrated in FIGS. 1-15. Vehicle 212 can provide an under carriage or tracked chassis 213 that enables the vehicle 212 to travel over the terrain where the pipeline 216 is to be placed. The vehicle 212 may have deck or bed 402, a lifting subsystem 404, a drive axle subsystem 502, and a tensioning subsystem 602. The crawler 212 may be designed to be small enough for maneuverability in tight spaces, but yet large enough to optimize the number of trips required to deploy the lay flat hose 304 and to optimize the time required to complete the trips.

In one or more embodiments, the crawler 212 may have a full length ranging from about 12 ft. to about 15 ft., a full width ranging from about 5 ft. to about 7 ft., and a carrying capacity of over 7,000 lbs. Powered by an engine having between about 70 hp to about 80 hp or more, the crawler 212 may travel at a maximum speed ranging from about 4 mph to about 8 mph or higher. A driver-operator of the crawler 212 may be seated in a location relative to the bed or deck 402 such that the lay flat hose 304 may be laid along the pipeline path 216 without obstructing the driver-operator's forward view. The bed 402 may be designed to provide a stable support structure for at least the spool 300, the lay flat hose 304, and the spool's base 406.

Loading and Unloading Reels to and/or from Deck of Vehicle

FIGS. 1-10 and 14-18 illustrate the lifting subsystem 404 of the crawler 212 in accordance with various embodiments of the invention. The lifting subsystem 404 may comprise any mechanism capable of lifting the spool 300 (or the combination of spool 300 and base 406) and placing it on the deck or bed 402 of the crawler 212.

In various embodiments, the lifting subsystem 404 comprises one or more arms 408, 409. An operator may control the movement of the arms 408, 409 via hydraulic cylinders 414, 415. The lift system 404 provides a pair of spaced apart arms 408, 409. Each arm is pivotally attached to chassis 213. Arm 408 is attached to chassis 213 at pivotal connection 416. Arm 409 is attached to chassis 213 at pivotal connection 417. Hydraulic cylinders 414, 415 are provided for raising or lowering arms 408, 409. Each cylinder 414, 415 has an extendable portion or pushrod. Cylinder 414 has extendable pushrod 422. Cylinder 415 has extendable pushrod 423. Each arm 408, 409 can be a telescoping arm, providing an extendable section. Arm 408 can telescope and lengthen by extending section 420. Arm 409 can telescope and lengthen by extending section 421 (see arrows 424). Each cylinder 414, 415 is pinned or otherwise connected to chassis 213.

An operator may control the arms 408, 409 to lift the spool 300 (or spool 300 plus base 406) off the ground and place the spool 300 (or spool 300 plus base 406) onto the bed 402 of the crawler 212 in an upright position (see FIGS. 7-9, 12 and 1-3). The lifting subsystem 404 of the crawler 212 may also be used to load and offload the spools 300 (or spool 300 plus base 406) from the conveyance vehicles 204.

Each cylinder 414, 415 pushrod 422, 423 is connected (pinned) to an arm 408 or 409 (see FIGS. 14-18). Pushrod 422 is pinned or pivotally attached at 416 to arm 408. Pushrod 423 is pinned or pivotally connected at 417 to arm 409. Each of the arms 408, 409 provides a free end portion in the form of a fitting 425 or 426. The arm 408 provides fitting 425. The arm 409 provides fitting 426. Each of the fittings 425, 426 can be in the form of a projecting portion, eyelet, or other lifting device that can be used to form a connection with a lifting sling that also connects to the reel 300. Fittings 425, 426 can each support or shackle to connect with a sling. The reel 300 could provide a hub or drum 308 that could be configured to form a connection with an eyelet of a lifting sling. Such lifting slings are commercially available and known. Slings are typically in the form of an elongated cable having a loop at each end portion of the cable. To lift a spool, two slings would be employed. Each sling would be attached to an arm 408, 409 at a fitting 425 or 426. Each sling would connect to spool 300 at hub or drum 308.

FIGS. 24-28 show a spool 300 supported upon its base 406 and prior to be loaded upon the deck or bed 402 of vehicle 212. In order to lift the spool 300 and its base 406 upon chassis 213 of vehicle 212, the fittings 425, 426 of arms 408, 409 would each be provided with a sling 427. Typically, such a lifting sling 427 would have eyelet end portions, one eyelet end portion attached to a fitting 425 of arm 408, the other sling having an eyelet that would be attached to the fitting 426 of the arm 409. These two slings would then be connected to opposing sides of the hub or drum 308 of spool 300. The spool 300 and its base 406 would then be lifted upwardly as illustrated by the arrows 427.

Figure 29:
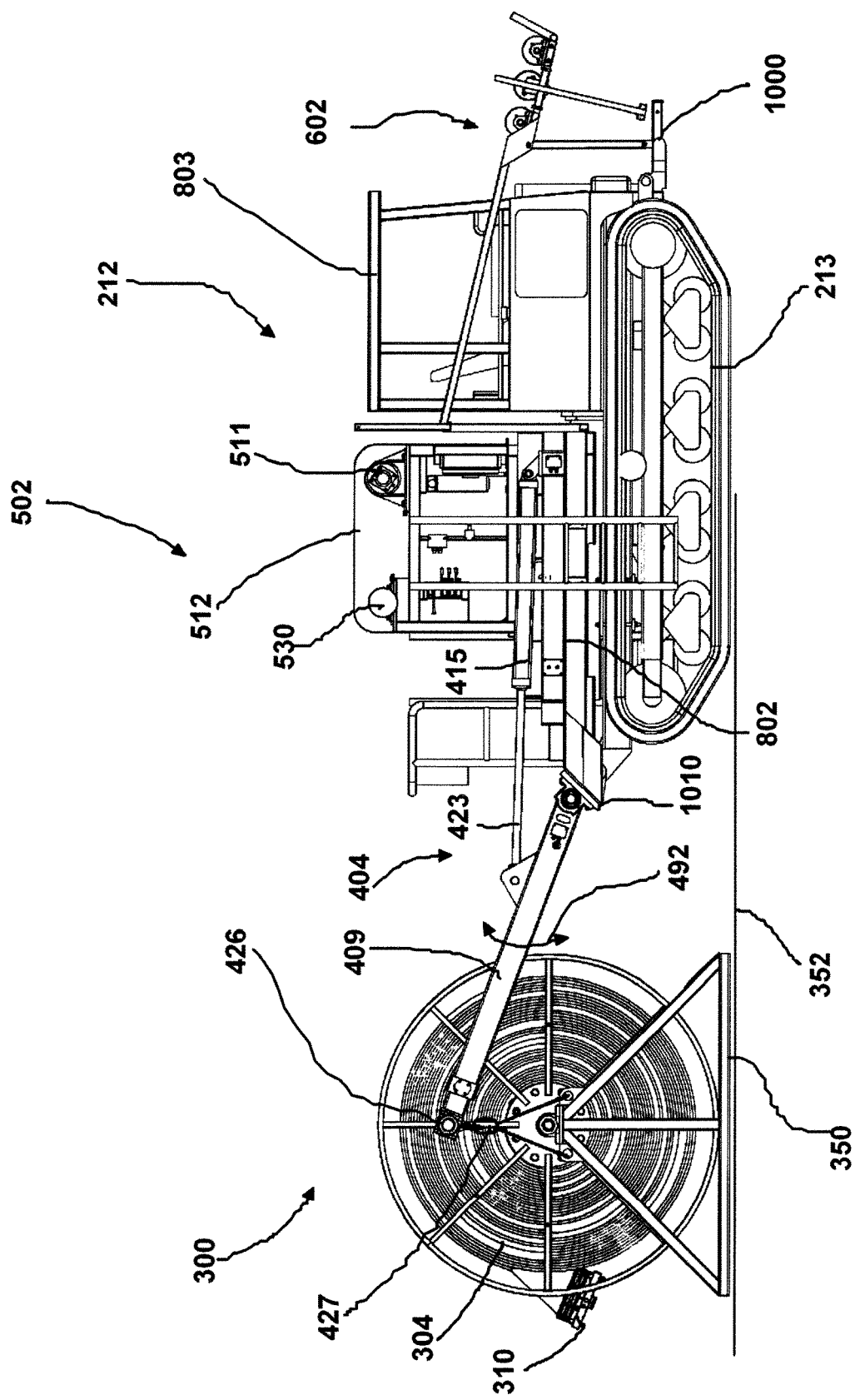
FIG. 29 is a side view of the reel lifting system of the vehicle about to pick up a reel.
Figure 34:
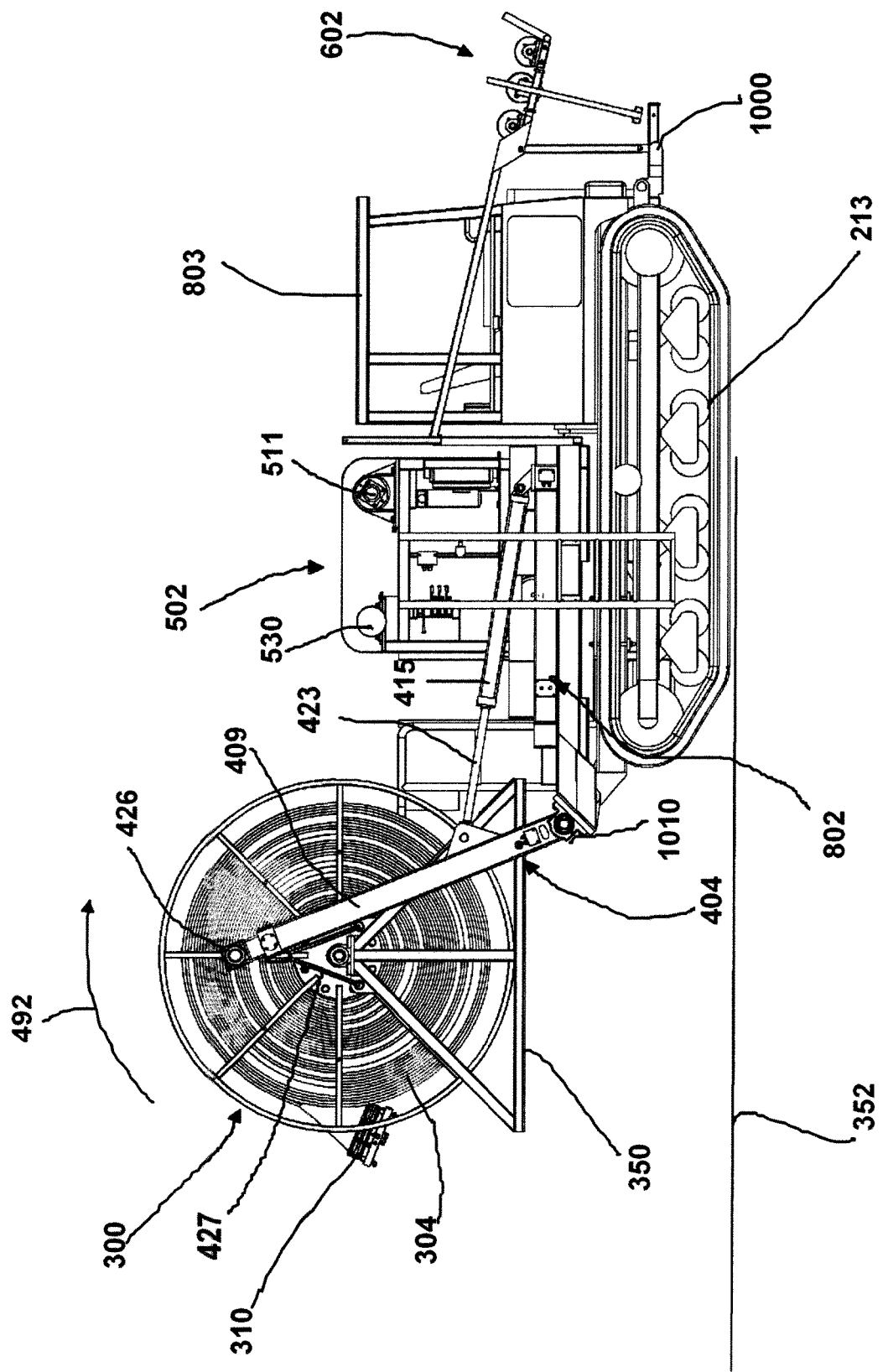
FIG. 34 is a perspective view of the reel lifting system of the vehicle in mid path when loading a reel.
Figure 35:
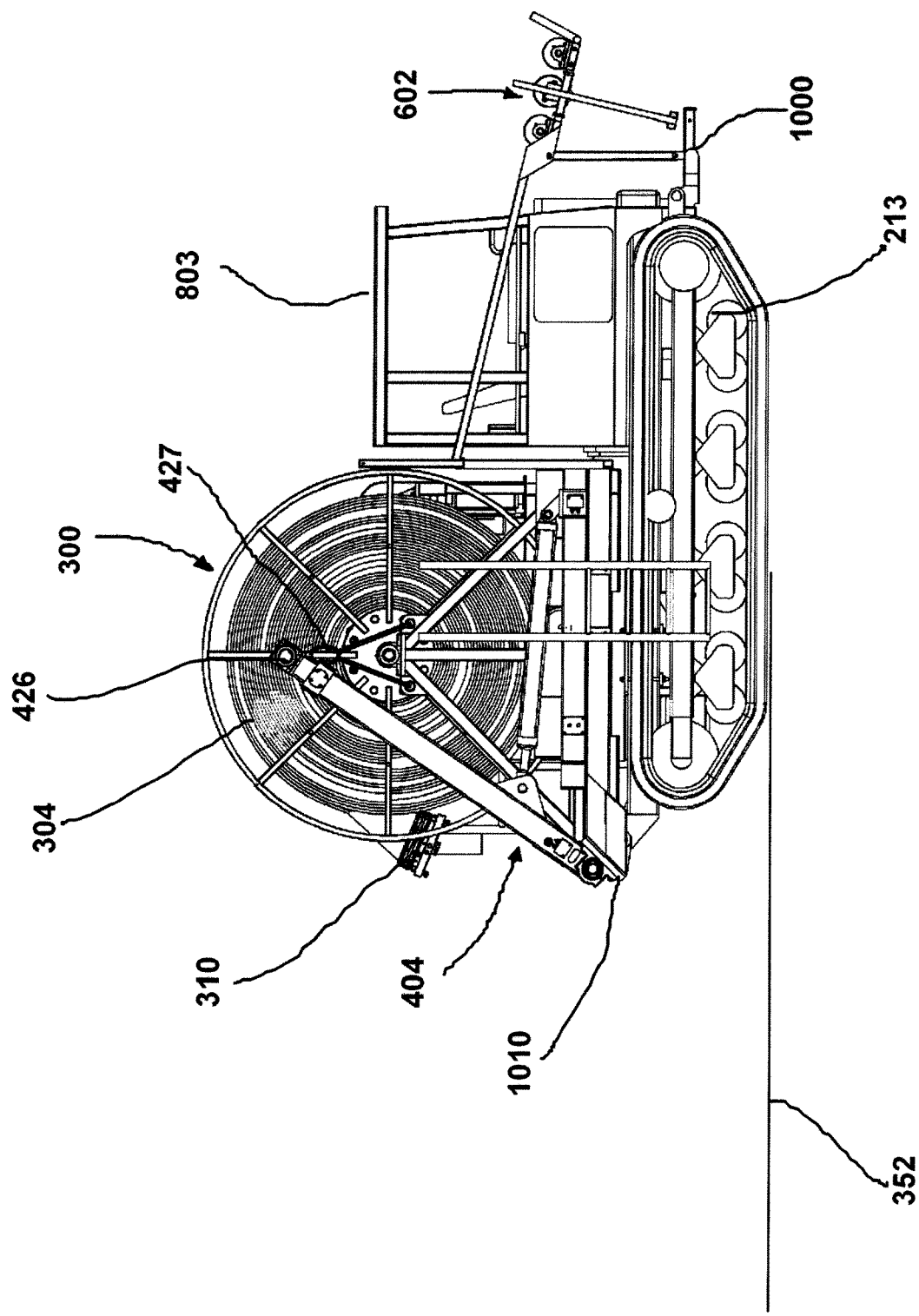
FIG. 35 is a perspective view of the reel lifting system of the vehicle placing the reel on the deck of the vehicle.

FIGS. 29-34 schematically illustrate lifting subsystem 404 of vehicle 212 lifting spool 300 from a ground surface 352. FIGS. 29 and 30 are respectively side and perspective views of the reel lifting system 404 about to pick up a reel 300. Sling 427 is used to connect reel 300 to ends 425 and 426 of arms 408, 408. FIG. 31 is an enlarged perspective view of a connection using lifting slings 427 between the reel lifting system 300 and the reel 300. FIGS. 32 and 33A are rear views of the reel lifting system 404 about to pick up a reel 300 from the ground 352. FIG. 33B is an enlarged view of a connection (sling 427) between the reel lifting system 404 and reel 300. During this movement rods 422 and 423 are respectively retracted into pistons 414 and 415 causing arms 408 and 409 to move in the direction of arrow 492. FIG. 34 is a side view of reel lifting system 404, having picked up reel 300 and now in mid path with motion schematically indicated by arrow 492. FIG. 35 is a side view of reel lifting system 404 now placing the lifted reel 300 on deck 802.

Figure 39:
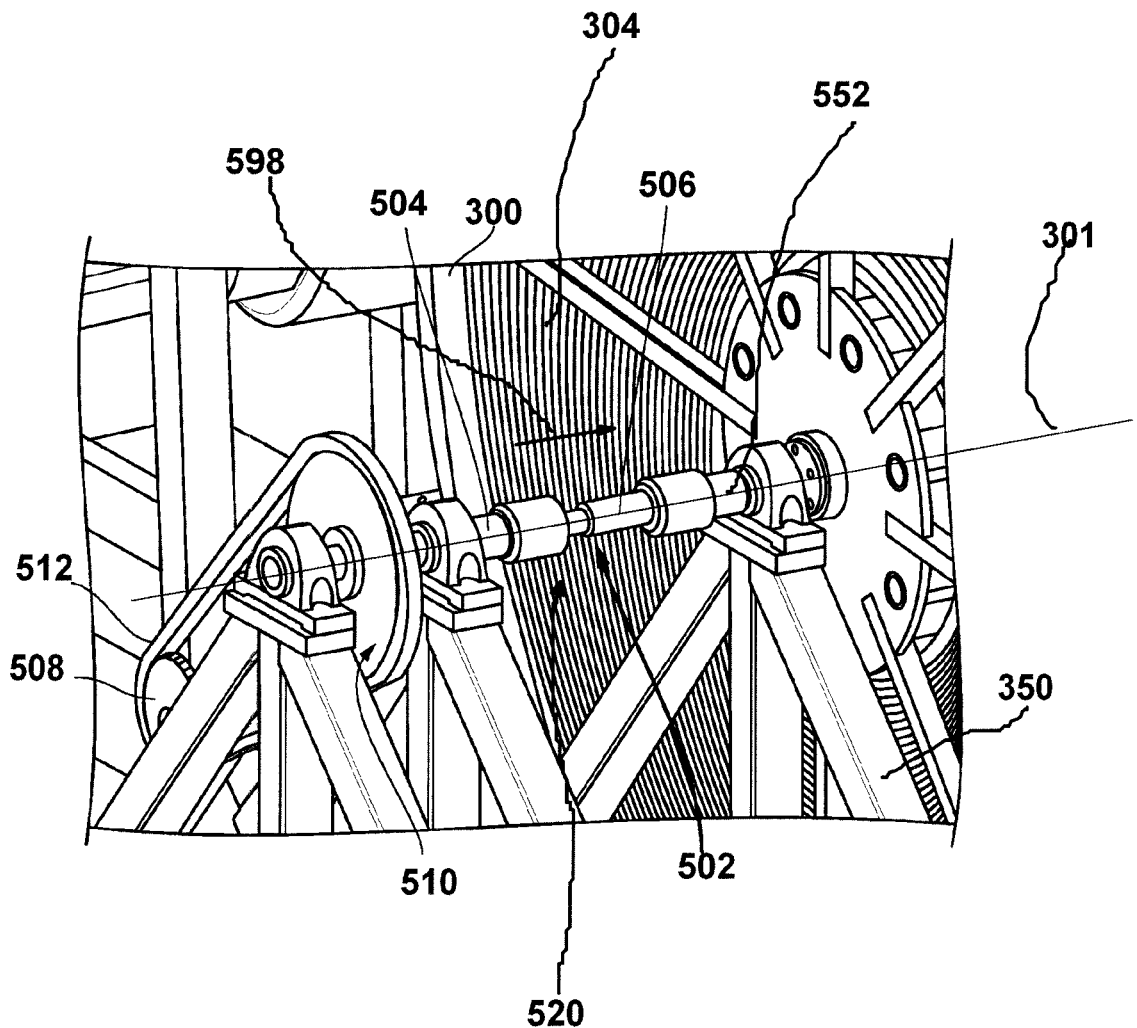
FIG. 39 is an enlarged perspective view of the connection between the reel driver and the reel after the reel has been placed on the vehicle.

After being placed on deck 802, drive axle subsystem 502 can be operably connected to reel 300, to control rotation of reel 300. FIG. 39 shows this type of connection with arrow 598 schematically indicating that telescoping section 520 can be extended in the direction of arrow 598 to operable couple reel 300 with drive axle subsystem 502.

Figure 36:
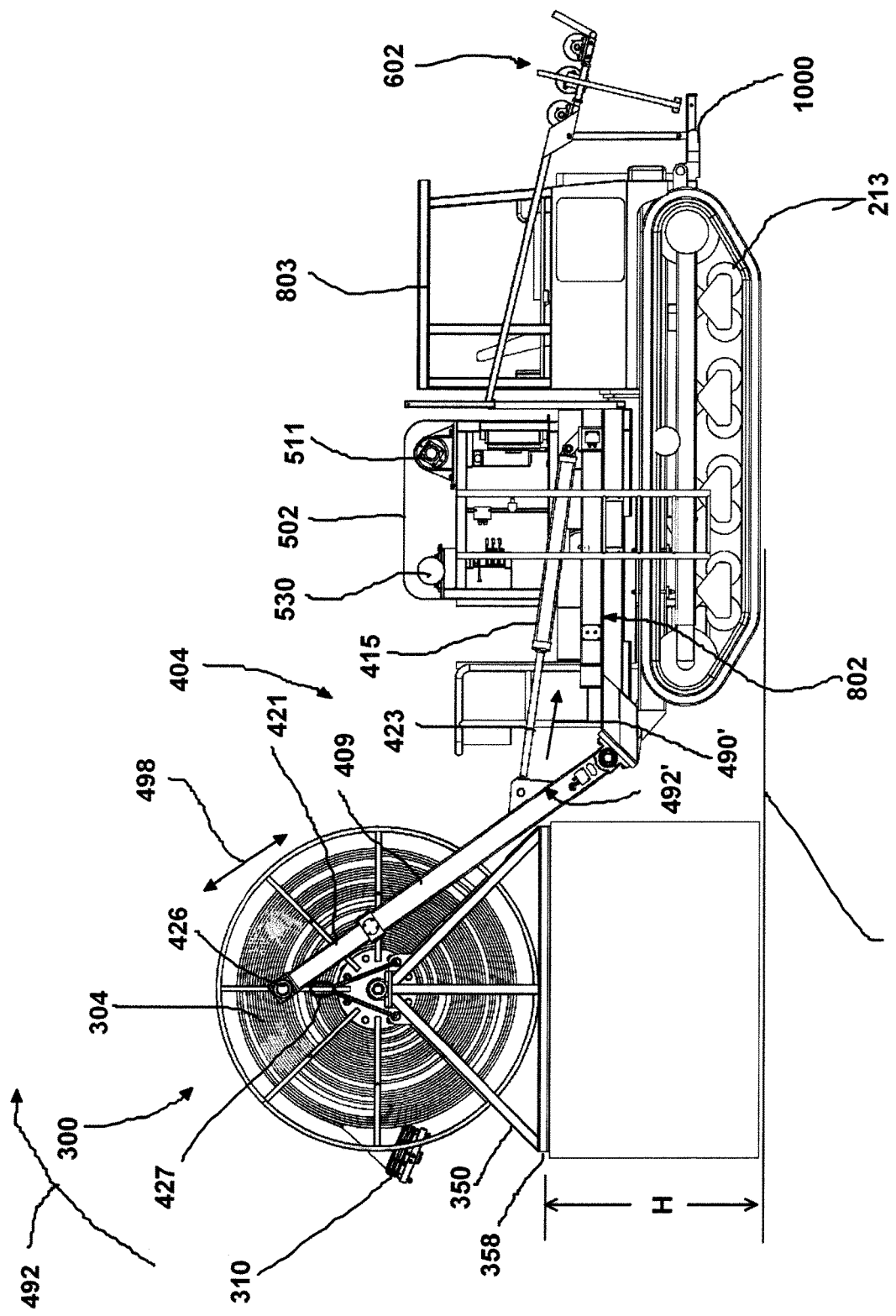
FIG. 36 is a perspective view of the reel lifting system of the vehicle about to pick up a reel from a raised area such as a trailer.
Figure 37:
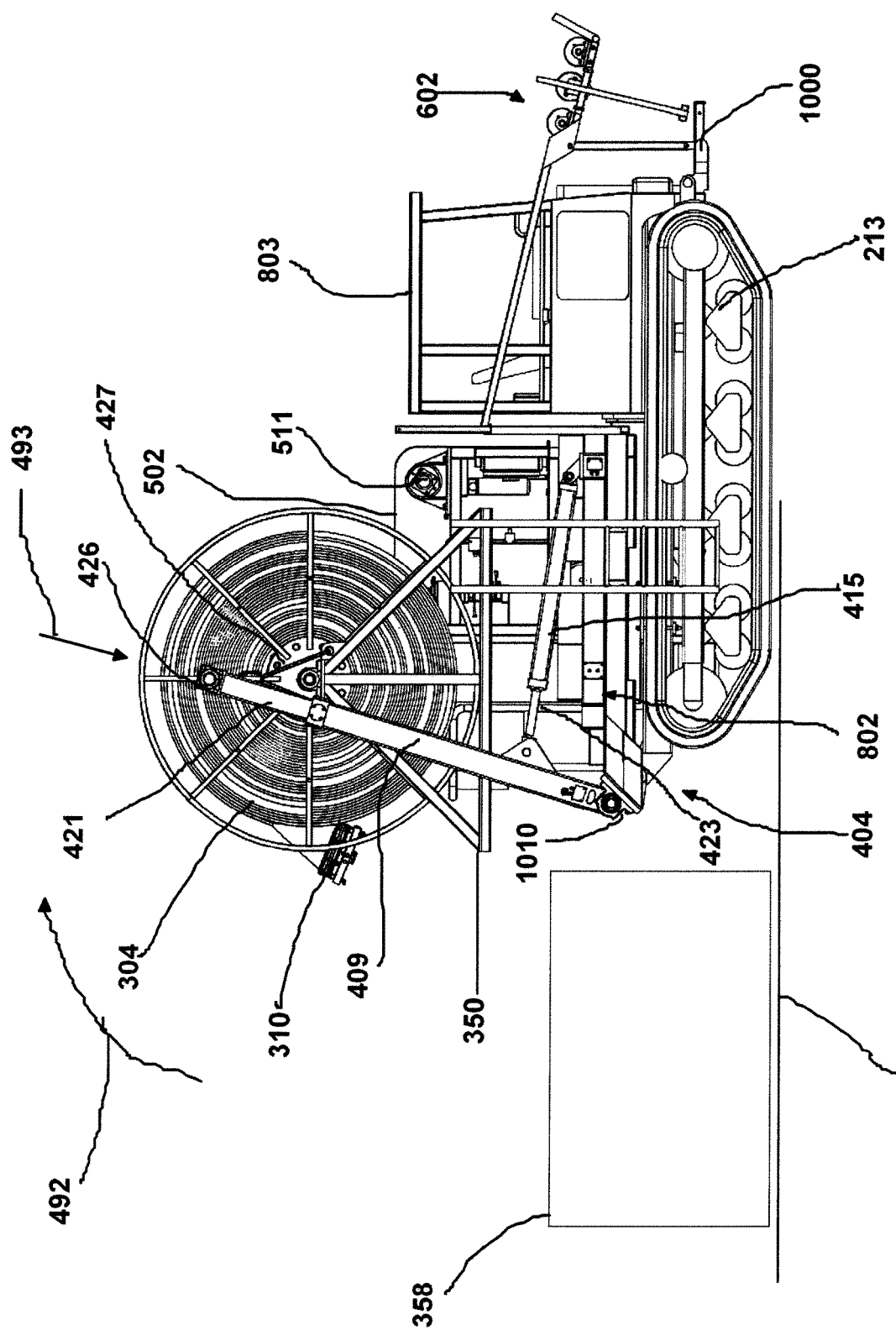
FIG. 37 is a perspective view of the reel lifting system of the vehicle in mid path when loading a reel.
Figure 38:
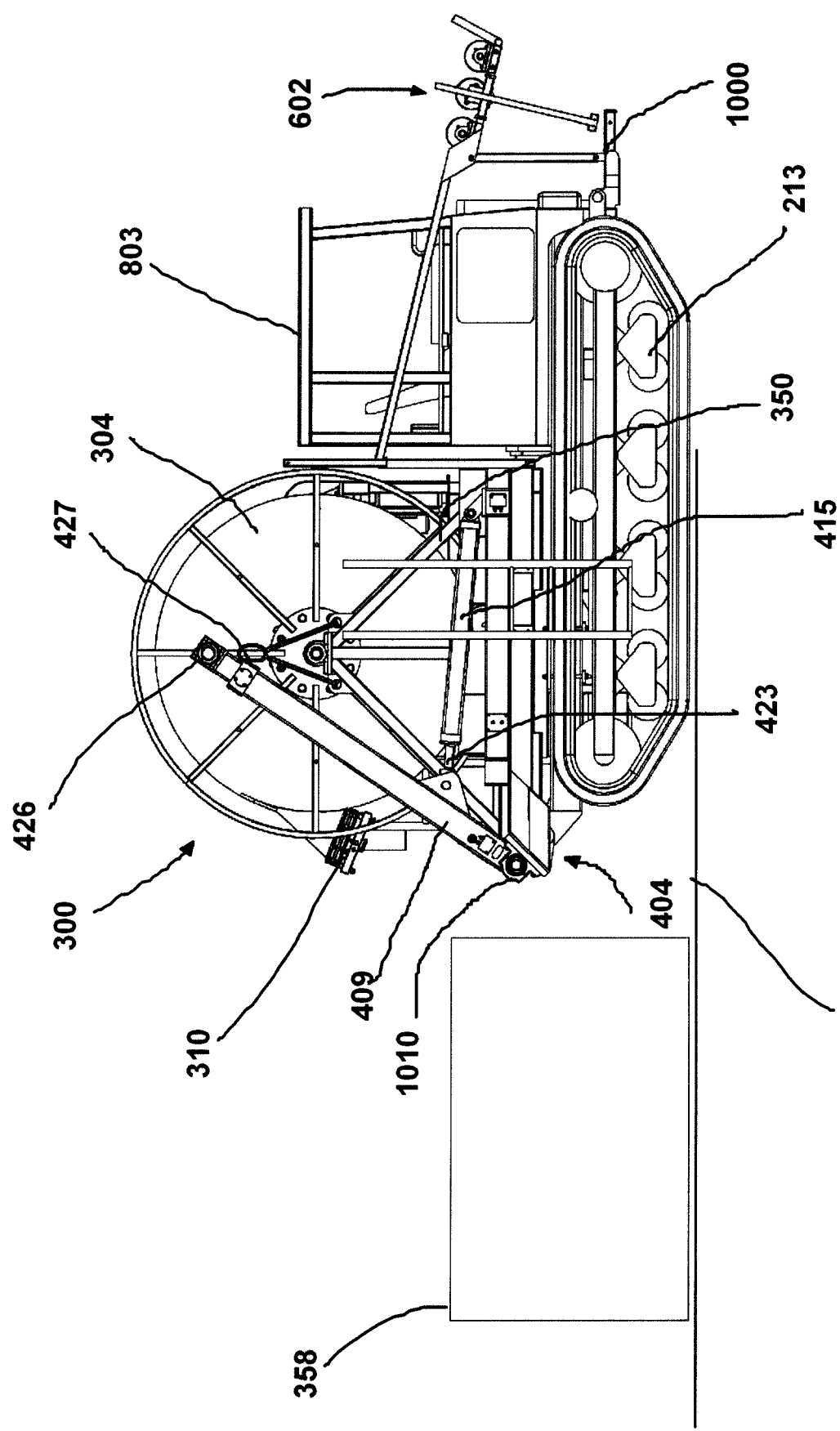
FIG. 38 is a perspective view of the reel lifting system of the vehicle placing the reel on the deck of the vehicle.

FIG. 36 is a perspective view of reel lifting system 404 about to pick up a reel 300 from a raised deck area 358 such as a trailer. In order to attach sling 427 to reel 300 at this upper height H, telescoping arms 420 and 421 can be selectively extended and/or retracted by an operator. Arrows 498 schematically indicate selective extension and/or retraction of arms 420 and 421 relative to arms 408 and 409. As shown in FIG. 18 a hydraulic piston/cylinder type arrangement can be used to extend and/or retract arms 420,421 relative to arms 408,409. FIG. 37 is a perspective view of the reel lifting system of the vehicle in mid path when loading a reel. During this movement rods 422 and 423 are respectively retracted into pistons 414 and 415 causing arms 408 and 409 to move in the direction of arrow 492. Additionally, telescoping arms 420 and 421 can be selectively retracted (schematically indicated by arrow 493) into arms 408 and 409 causing spool 300 to be lowered towards deck 802. FIG. 38 is a perspective view of the reel lifting system of the vehicle placing the reel on the deck of the vehicle. During this movement telescoping arms 420 and 421 can be selectively retracted by an operator to place base 350 of reel 300 on deck 802 of vehicle 212.

Couplings for Lay Flat Hose Sections

Any type of coupling 310 suitable for connecting two ends of the lay flat hose 304 may be used. For example, in one or more embodiments, the first end 306 of each laid hose segment 304 may be connected to the second end 312 of the previously laid lay flat hose segment 304 using an easy to connect, unisex coupling 310 that substantially eliminates water leakage and has a suitable pressure rating. In the foregoing described manner, the lay flat hose 304 may be connected in series, from end to end, until a pipeline 216 spanning at least the length from the water source 208 to the frac water destination 210, or vice-versa, is constructed.

Components of Pipeline Incorporating Laid Out Hose

One or more pumps 218 may be integrated within the pipeline 216 to force the flow of water through the pipeline 216. One or more filter pods 220 may also be integrated within the pipeline 216 to remove particulate matter originating from the water source 208 before the frac water reaches its destination 210. More than one lay flat hose 304 pipelines 216 may be constructed as part of the rapid deployment and retrieval of a system for transferring frac water. As previously described, design parameters 222 may be determined based in part on insight gained from the computer program product 224.

U.S. Provisional Application No. 61/479,641 and U.S. Pub. No. 2010/0059226 A1 are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

One or more embodiments of the invention are directed to methods for the rapid deployment and retrieval of frac water transfer systems in accordance with embodiments of the invention.

Accordingly, compared to conventional methods, embodiments of the present invention may substantially reduce the number of person-hours and the number of one-way vehicular trips required to complete the pipeline, thereby reducing cost and the potential for harm to humans and the environment.

Locking and Unlocking System for Reel

Figure 52:
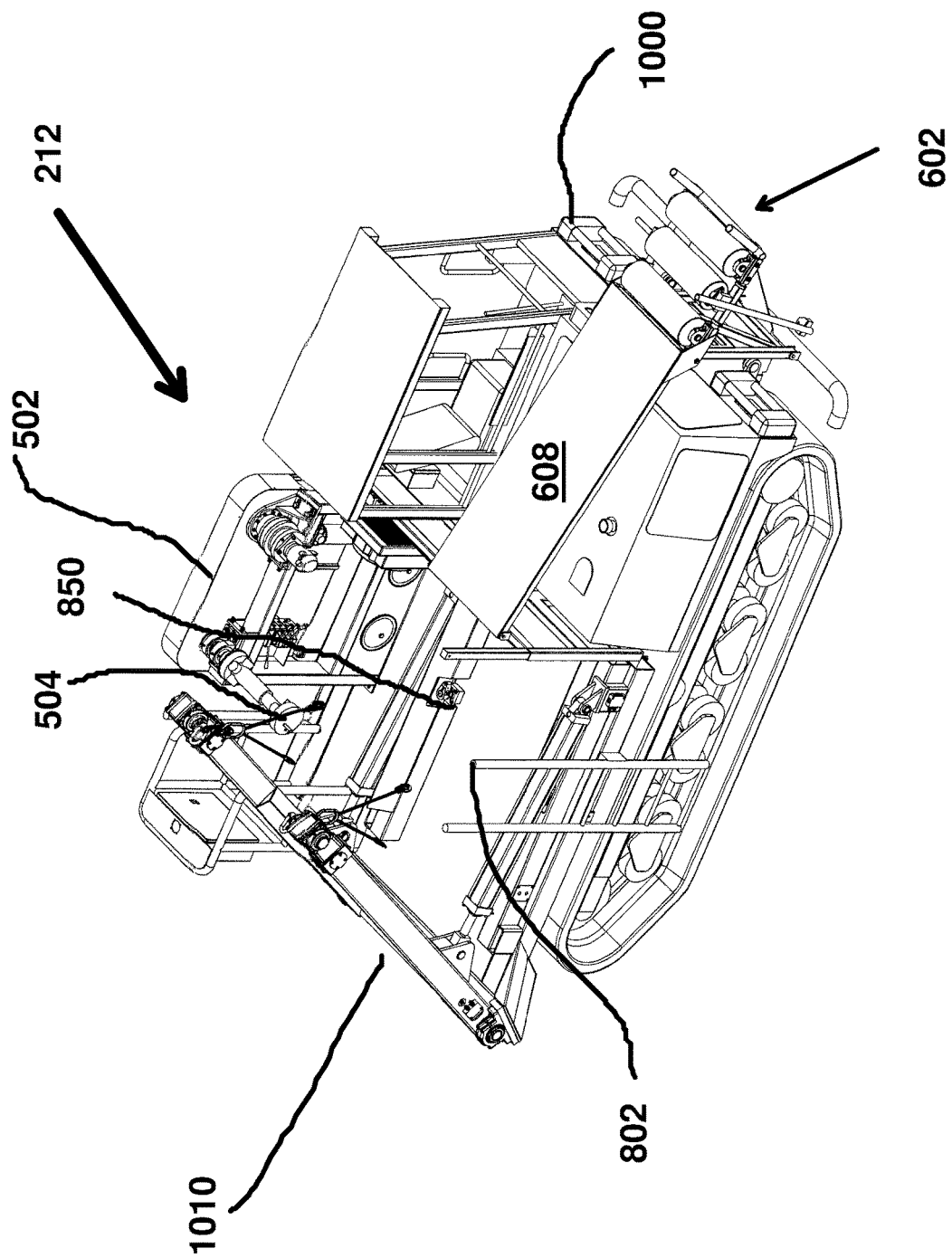
FIG. 52 is a front perspective view of the vehicle of FIG. 1 taken from the non-driver side and showing the reel locking system.
Figure 56:
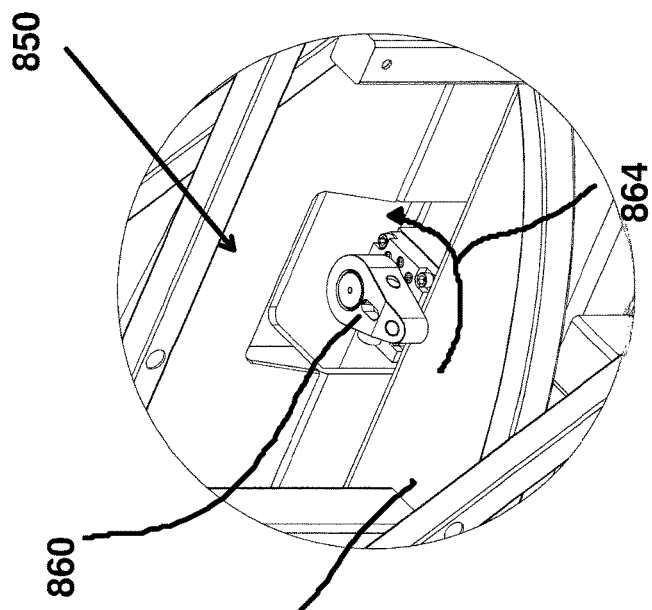
FIG. 56 is an enlarged perspective view of the reel locking system shown in FIG. 55.
Figure 55:
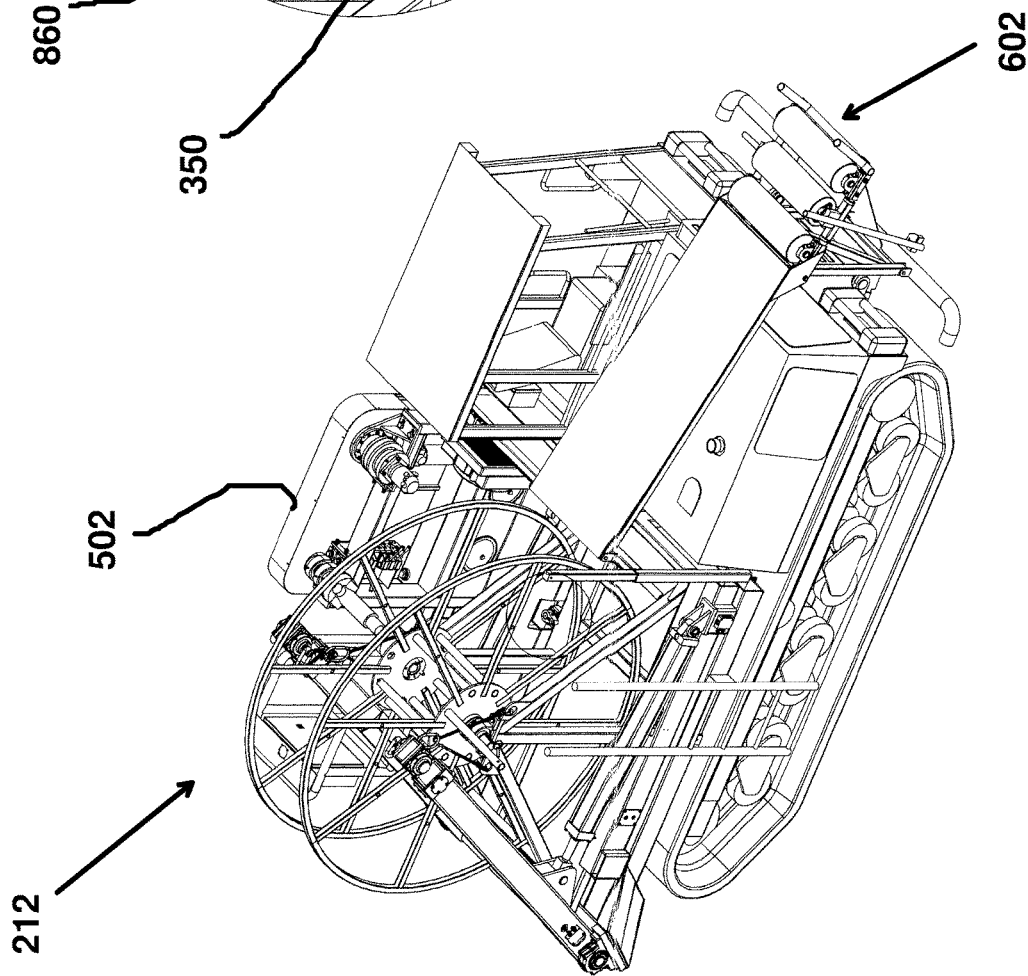
FIG. 55 is a front perspective view of the vehicle of FIG. 52 with a reel loaded on the vehicle and the reel locking system in an locked state.

FIG. 52 is a front perspective view of vehicle 212 from the non-driver side and showing the reel locking system 850. FIG. 53 is a front perspective view of vehicle 212 with a reel 300 loaded on the vehicle bed 800 and the reel locking system 850 in an unlocked state. FIG. 54 is an enlarged perspective view of the reel locking system 850 shown in an unlocked state. FIG. 55 is a front perspective view of vehicle 212 with the reel locking system 850 in a locked state so that pivoting arm 860 has pivoted over base 350 of reel 300. FIG. 56 is an enlarged perspective view of the reel locking system 850 shown in the locked state. To move from the locked to unlocked state, controller 870 can cause arm 860 to rotat in the direction of arrow 862 and away from base 350.

Reel locking system 850 can include a pivoting arm 860 which pivots in the direction of arrow 862 over base 350 to lock reel 300 in position. Controller 870 can place reel locking system in locked and unlocked states.

The following is a list of reference numerals used in this application:

REFERENCE NUMERAL LISTING:

| REFERENCE NUMBER | DESCRIPTION |
|---|---|
| 200 | system |
| 202 | one or more spools or reels |
| 204 | one or more conveyance vehicles |
| 206 | equipment site |
| 208 | water source |
| 210 | frac water destination |
| 212 | off-road vehicles/crawler |
| 213 | tracked chassis/under carriage |
| 214 | various other types of equipment |
| 216 | current pipeline |
| 218 | one or more pumps |
| 290 | arrow |
| 300 | reel |
| 301 | axis |
| 302 | spokes |
| 304 | one or more segments of lay flat hose |
| 306 | first end |
| 308 | drum |
| 310 | coupling |
| 312 | second end |
| 314 | section of laid out hose |
| 316 | section of laid out hose with water |
| 318 | section of hose with water removed |
| 320 | bearing |
| 330 | connection with reel drive system |
| 350 | spool's base |
| 352 | ground |
| 358 | elevated surface |
| 404 | lifting subsystem |
| 406 | spool's base |
| 408 | arm |
| 409 | arm |
| 410 | one or more linkages |
| 414 | one or more hydraulic cylinder |
| 415 | hydraulic cylinder |
| 416 | pivotal connection |
| 417 | pivotal connection |
| 418 | pinned connection |
| 419 | pinned connection |
| 420 | extendable section |
| 421 | extendable section |
| 422 | pushrod |
| 423 | pushrod |
| 424 | arrow |
| 425 | fitting |
| 426 | fitting |
| 427 | shackle |
| 490 | arrow |
| 492 | arrow |
| 493 | arrow |
| 494 | arrow |
| 496 | arrow |
| 498 | arrow |
| 502 | drive axle subsystem |
| 504 | drive shaft |
| 506 | axial shaft |

-continued

REFERENCE NUMERAL LISTING:

| REFERENCE NUMBER | DESCRIPTION |
|---|---|
| 508 | first gear |
| 510 | second gear |
| 511 | motor |
| 512 | chain |
| 513 | guard |
| 520 | telescoping connection |
| 522 | first end |
| 524 | second end |
| 530 | first section |
| 540 | second section |
| 550 | connection |
| 552 | locking connection |
| 590 | arrow |
| 592 | arrow |
| 596 | arrow |
| 602 | tensioning subsystem |
| 603 | roller |
| 604 | roller |
| 605 | roller |
| 606 | support structure |
| 608 | take up deck |
| 609 | handle |
| 610 | pivot |
| 611 | rod |
| 612 | coupling |
| 620 | support cup |
| 622 | plurality of bearings |
| 612 | hydraulic cylinder |
| 690 | arrow |
| 692 | arrow |
| 694 | arrow |
| 696 | arrow |
| 698 | arrow |
| 704 | one or more design parameters |
| 706 | computer program product output |
| 708 | step |
| 710 | step |
| 712 | step |
| 714 | step |
| 716 | step |
| 718 | lay flat hose pipeline |
| 720 | step |
| 802 | bed/deck |
| 803 | cab/cabin |
| 850 | reel locking system |
| 860 | pivoting arm |
| 862 | arrow |
| 864 | arrow |
| 870 | arrow |
| 890 | arrow |
| 892 | arrow |
| 894 | arrow |
| 900 | arrow |
| 910 | arrow |
| 920 | arrow |
| 930 | arrow |
| 940 | arrow |
| 1000 | first end |
| 1010 | second end |

The foregoing embodiments are presented by way of example only; the scope of the present invention is to be limited only by the following claims.

The invention claimed is:

1. Apparatus for taking up a previously laid out temporary lay flat hose type pipeline containing at least some fluid, comprising:
(a) a mobile chassis, the chassis having first and second opposed working end portions with respective first and second opposed working end directions;
(b) a deck on the chassis that is sized and shaped to selectively hold at least one of a plurality of hose reels, each hose reel having a supportive reel base, wherein each reel is rotatable upon a reel base;

(c) the first working end portion having one or more lifting arms that are each pivotally attached to the chassis, the lifting arms being configured to lift a selected reel from the plurality of reels from a position on the chassis to a position off of the chassis, and also from a position off of the chassis to a position on the chassis;

(d) a selected reel from the plurality of hose reels being supported on the chassis, and (e) a tensioning system rotationally connected to the selected reel when the reel is on the chassis, the tensioning system comprising at least one roller which is located at the second working end portion of the chassis, the tensioning system being selectively activated to put in tension a hose across the at least one roller winding when such hose onto the selected reel when the mobile chassis is moving generally in the second working end direction.

2. The apparatus of claim 1, wherein the tensioning system includes a plurality of rollers selectively engaging the hose.

3. The apparatus of claim 2, wherein the hose is routed through the plurality of rollers in an alternating over and under configuration.

4. The apparatus of claim 3, wherein the reel has an axis of rotation, and there are three adjacent rollers, a front, a middle, and a rear roller, each roller having an axis of rotation parallel to the axes of rotation of the other rollers, and each being parallel to the reel's axis of rotation, and the axis of rotation of the middle roller being selectively adjustable to be out of parallel with the axes of rotation of the other rollers, and selectively adjustable to be back in a parallel relationship.

5. The apparatus of claim 1, wherein the mobile chassis is moving at a mobile chassis speed, and the tensioning system winds up the hose on the selected reel at substantially the same speed as the mobile chassis speed.

6. The apparatus of claim 1, wherein a wind up speed at which the tensioning system winds up the hose on the selected reel varies with a chassis speed of mobile chassis relative to the ground.

7. The apparatus of claim 1, wherein during a pickup of the hose, the tensioning system consistently applies an over torque on the reel to keep the section of hose between the reel and the at least one roller in tension.

8. The apparatus of claim 7, wherein an amount of torque is applied on the selected reel, and the amount of over torque applied on the selected reel is variable by an operator while the mobile chassis is moving.

9. The apparatus of claim 1, wherein the selected reel is removably attached to the chassis for enabling the at least one lifting arm to unload the selected reel after the selected reel is filled with a length of hose, the selected reel being lifted by the one or more lifting arms from the chassis and placed in a position off of the chassis, and subsequently a second selected reel is lifted by the one or more lifting arms from a position off of the chassis and placed on the chassis, and the tensioning system is rotationally connected to the second reel when the second reel is on the chassis and selectively activated to pull additional portions of the lay flat hose across the at least one roller winding such pulled hose portions onto the second reel when the chassis is moving generally in the second working end.

10. The apparatus of claim 1, wherein there are two spaced apart lifting arms, and each of the arms includes telescoping sections, and the lifting arms are selectively rotatable about their pivot points and the telescoping sections selectively are selectively extendable and retractable.

11. A method of picking up a fluid flow line comprised of multiple lengths of lay flat hose connected end to end, comprising the steps of:

(a) providing a mobile chassis having opposed first and second working end portions, the assembly including a spool rotatable upon the base; and a tensioning system which can be rotatively connected to the spool, the tensioning system comprising at least one pickup roller which is located at the second opposed working end portion of the chassis, the roller pickup being supported on at least one arm;

(b) the first opposed working end portion of the chassis having at least one lifting arm pivotally attached to the chassis, the at least one lifting arm being configured to lift selected reel assemblies from positions off the chassis to the chassis, and from the chassis to positions off of the chassis;

(c) the at least one lifting arm picking up a first selected hose reel assembly from a position off of the chassis and placing it on the chassis, and rotationally connecting the tensioning system to the spool of the first selected hose reel assembly;

(d) after step "c", connecting the hose to the spool of the first selected hose reel assembly, and the tensioning system being selectively activated to wind the spool, wherein such winding puts in tension the hose traveling across the at least one roller;

(e) moving the chassis while simultaneously winding the hose from the ground onto the spool of the first reel assembly;

(f) after the spool of the first selected hose reel assembly has filled with wound up hose, the at least one arm removing the first selected hose reel assembly from the chassis deck;

(g) after step "f", the at least one arm loading a second selected hose reel assembly including a spool on the chassis and the tensioning system being rotationally connected to the spool of the second selected hose reel assembly, and moving the chassis while simultaneously winding up the hose from the ground onto the spool of the second selected hose reel assembly while the tensioning system being selectively activated to pull portions of the hose across the roller supported by the at least one arm; and (h) wherein in steps "d" through "g", the hose is raised from a ground surface at the second working end portion of the chassis.

12. The method of claim 11, wherein in step "a", the tensioning system includes a plurality of rollers selectively engaging the hose.

13. The method of claim 12, wherein in step "e", the plurality of rollers apply tension to the hose when the hose is wound upon the first selected hose reel.

14. The method of claim 11, wherein in step "e", the hose is routed through the plurality of rollers in an alternating over and under configuration.

15. The method of claim 11, wherein in step "f" the selected reel assembly is removably attached to the chassis for enabling the at least one lifting arm to unload the selected reel assembly after the spool is filled with a length of hose, the selected reel assembly being lifted by the one or more lifting arms from the chassis and placed in a position off of the chassis, and subsequently in step "g" a second empty selected second reel assembly is lifted by the one or more lifting arms from a position off of the chassis and placed on the chassis, and the tensioning system is rotationally connected to the spool of the second reel assembly when the second reel assembly is on the chassis and selectively activated to pull additional portions of the lay flat hose across the at least one roller winding such pulled hose portions onto the spool of the second reel assembly when the chassis is moving generally in the direction of the second end of the chassis.

16. The method of claim 11, wherein in step "c" there are two spaced apart lifting arms, and each of the arms includes telescoping sections, and the lifting arms are selectively rotatable about their pivot points and the telescoping sections selectively are selectively extendable and retractable.

17. The method of claim 11, wherein step "e" further comprises the step of spooling each length of hose upon a spool after the pipeline is no longer conveying fluid.

18. The method of claim 11, further comprising flattening the hose before the hose reaches the spool.

19. The method of claim 11, wherein in step "c" the tensioning system is rotationally connected to the spool with a retractable shaft that moves between retracted and extended positions.

20. The method of claim 11, wherein the shaft retracts before the end of step "c", and extends to rotationally connect the spool to the tensioning system.

\* \* \* \* \*